US009498924B2

(12) United States Patent
Norris et al.

(10) Patent No.: US 9,498,924 B2
(45) Date of Patent: Nov. 22, 2016

(54) OPHTHALMIC LENS MOLDS WITH LOW LEVELS OF UV LIGHT TRANSMITTANCE, OPHTHALMIC LENSES MOLDED THEREIN, AND RELATED METHODS

(75) Inventors: Lee Darren Norris, Southampton (GB); Edyta S. Bialek, Southampton (GB); Sarah L. Almond, Eastleigh (GB); David Robert Morsley, Eastleigh (GB); A. K. M. Shahab Siddiqui, Pleasanton, CA (US); Richard C. Rogers, Eastleigh (GB); Ian Bruce, Southampton (GB); Benjamin S. Sheader, Southampton (GB)

(73) Assignee: CooperVision International Holding Company, LP, St. Michael (BB)

( * ) Notice: Subject to any disclaimer, the term of this patent is extended or adjusted under 35 U.S.C. 154(b) by 699 days.

(21) Appl. No.: 13/805,197

(22) PCT Filed: Jul. 8, 2011

(86) PCT No.: PCT/US2011/043288
§ 371 (c)(1),
(2), (4) Date: Mar. 7, 2013

(87) PCT Pub. No.: WO2012/006488
PCT Pub. Date: Jan. 12, 2012

(65) Prior Publication Data
US 2013/0293831 A1    Nov. 7, 2013

Related U.S. Application Data

(60) Provisional application No. 61/369,111, filed on Jul. 30, 2010, provisional application No. 61/362,925, filed on Jul. 9, 2010.

(51) Int. Cl.
*C08F 2/46* (2006.01)
*B29D 11/00* (2006.01)
*G02B 1/04* (2006.01)

(52) U.S. Cl.
CPC ......... *B29D 11/00442* (2013.01); *G02B 1/043* (2013.01)

(58) Field of Classification Search
CPC .................. B29D 11/00442; G02B 1/043
USPC ........................................................ 264/496
See application file for complete search history.

(56) References Cited

U.S. PATENT DOCUMENTS

| 4,921,205 | A | 5/1990 | Drew, Jr. et al. |
| 5,158,717 | A | 10/1992 | Lai |
| 5,274,008 | A | 12/1993 | Lai |
| 5,326,505 | A | 7/1994 | Adams et al. |
| 5,789,461 | A | 8/1998 | Nicolson et al. |
| 5,910,537 | A | 6/1999 | Feingold et al. |
| 5,998,498 | A | 12/1999 | Vanderlaan et al. |
| 6,310,116 | B1 | 10/2001 | Yasuda et al. |
| 6,465,538 | B2 | 10/2002 | Lai |
| 6,867,245 | B2 | 3/2005 | Iwata et al. |
| 6,997,428 | B1 | 2/2006 | Andino et al. |
| 7,320,587 | B2 | 1/2008 | Goodenough et al. |
| 7,750,079 | B2 | 7/2010 | Almond et al. |
| 2002/0045706 | A1 | 4/2002 | Houston et al. |
| 2002/0099112 | A1 | 7/2002 | Turner et al. |
| 2003/0052424 | A1 | 3/2003 | Turner et al. |
| 2003/0164562 | A1 | 9/2003 | Li et al. |
| 2004/0075039 | A1 | 4/2004 | Dubey et al. |
| 2005/0255231 | A1 | 11/2005 | Hill et al. |
| 2006/0063852 | A1 | 3/2006 | Iwata et al. |
| 2006/0072069 | A1 | 4/2006 | Laredo et al. |
| 2007/0035050 | A1* | 2/2007 | Rogers .......................... 264/1.32 |
| 2007/0035052 | A1 | 2/2007 | Goodenough et al. |
| 2007/0132119 | A1 | 6/2007 | Rastogi et al. |
| 2007/0242219 | A1* | 10/2007 | Zanini et al. ................. 351/177 |
| 2007/0291223 | A1 | 12/2007 | Chen et al. |
| 2007/0296914 | A1 | 12/2007 | Hong et al. |
| 2008/0001317 | A1 | 1/2008 | Tokarski et al. |
| 2008/0290534 | A1 | 11/2008 | Yin et al. |
| 2008/0290535 | A1 | 11/2008 | Molock, Jr. et al. |
| 2009/0230575 | A1* | 9/2009 | Liu .......................... B29C 33/40 264/1.1 |
| 2010/0155976 | A1* | 6/2010 | Liu .................. B29D 11/00519 264/1.38 |
| 2011/0057337 | A1 | 3/2011 | Hagmann et al. |

(Continued)

FOREIGN PATENT DOCUMENTS

| CN | 1061931 A | 6/1992 |
| CN | 1355739 A | 6/2002 |

(Continued)

OTHER PUBLICATIONS

Osswald, Tim, "Polymer Processing Fundamentals", Hanser Publishers, 1998, p. 119.*
Japanese Office Action dated Feb. 23, 2015 in corresponding application No. 2013-519715 and English translation (5 pages).
Lai et al., "Surface wettability enhancement of silicone hydrogel lenses by processing with polar plastic molds," J. Biomed Mater Res., 35, 1997, pp. 349-356.
International Search Report issued in corresponding International Patent Application No. PCT/US2011/043288 dated Feb. 9, 2012 (12 pages).

(Continued)

*Primary Examiner* — Galen Hauth
(74) *Attorney, Agent, or Firm* — Kilyk & Bowersox, P.L.L.C.

(57) ABSTRACT

Ophthalmic lens molds made from one or more thermoplastic polymer having a low level of UV light transmittance (UV % T) ophthalmic lenses including silicone hydrogel contact lenses molded using these thermoplastic polymer having low UV % T, and methods of manufacturing ophthalmic lenses by cast molding a polymerizable composition in mold members formed of these thermoplastic polymers having low UV % T and curing the polymerizable composition using UV light are described.

10 Claims, 1 Drawing Sheet

(56) References Cited

U.S. PATENT DOCUMENTS

| | | | |
|---|---|---|---|
| 2011/0318539 A1* | 12/2011 | Ozawa et al. | 428/172 |
| 2012/0172486 A1* | 7/2012 | Zhu et al. | 523/106 |

FOREIGN PATENT DOCUMENTS

| | | |
|---|---|---|
| CN | 101229667 A | 7/2008 |
| CN | 101237987 A | 8/2008 |
| CN | 101284694 A | 10/2008 |
| CN | 101317122 A | 12/2008 |
| CN | 101467093 A | 6/2009 |
| EP | 0687550 A2 | 12/1995 |
| JP | 62109826 A | 5/1987 |
| JP | 62-250970 A | 10/1987 |
| JP | 1287157 A | 11/1989 |
| JP | 2187441 A | 7/1990 |
| JP | 06-106552 A | 4/1994 |
| JP | 06-170857 A | 6/1994 |
| JP | 2002137230 A | 5/2002 |
| JP | 2006-001286 A | 1/2006 |
| JP | 2008-050576 A | 3/2008 |
| JP | 2008-077097 A | 4/2008 |
| JP | 2008-239898 A | 10/2008 |
| KR | 20020040839 A | 5/2002 |
| KR | 20100024254 A | 3/2010 |
| WO | 9209421 A2 | 6/1992 |
| WO | 2006026474 A2 | 3/2006 |
| WO | 2012006485 A2 | 1/2012 |

OTHER PUBLICATIONS

International Preliminary Report on Patentability issued in corresponding International Patent Application No. PCT/2011/043288 dated Nov. 1, 2012 (13 pages).

European Search Report issued in corresponding European Patent Application No. 11813255.4 dated May 19, 2015 (5 pages).

Japanese Final Rejection issued in corresponding Japanese Patent Application No. 2013-519714 dated Nov. 18, 2015 (10 pages) English translation attached.

* cited by examiner

OPHTHALMIC LENS MOLDS WITH LOW LEVELS OF UV LIGHT TRANSMITTANCE, OPHTHALMIC LENSES MOLDED THEREIN, AND RELATED METHODS

This application is a National Stage Application of PCT/US2011/043288, filed Jul. 8, 2011, which claims the benefit under 35 U.S.C §119(e) of prior U.S. Provisional Patent Application No. 61/362,925, filed Jul. 9, 2010, and U.S. Provisional Patent Application No. 61/369,111, filed Jul. 30, 2010, which are incorporated in their entirety by reference herein.

FIELD

The present disclosure relates to ophthalmic lens molds comprising at least one thermoplastic polymer having a low level of ultraviolet light (UV) transmittance, ophthalmic lenses cast molded using these thermoplastic polymer molds, and related methods. More particularly, the disclosure relates to lens molds formed of thermoplastic polymer having a low level of ultraviolet light (UV) transmittance, hydrogel contact lenses including silicone hydrogel contact lenses cast molded using these molds, and methods of using these molds in the manufacture of hydrogel contact lenses, including silicone hydrogel contact lenses.

BACKGROUND

Over the years, a number of different types of thermoplastic polymers materials have been used to manufacture molds for forming ophthalmic lenses using various types of polymerizable lens-forming compositions and using various lens-making processes, including spin casting, lathing and cast molding.

U.S. Pat. No. 4,921,205 issued to Drew, Jr. et al., describes a process of making and machining lens blanks to form either soft or rigid gas permeable contact lenses. The process of Drew, Jr. involves specifically formulating a material for a mold member in order to cause the lens blank to strongly adhere to the mold member after curing. The process includes forming the mold member, casting a polymerizable lens blank into the mold member, heating the polymerizable lens blank and the mold member to polymerize or set the lens blank in the mold member to create an integral blank-mold member structure, and machining the integral blank-mold member structure by first machining away the softer mold member to reveal the lens blank, and then machining the lens blank to form a lens. Drew, Jr. et al. lists a number of types of conventional thermosetting or thermoplastic soft lens materials and rigid gas permeable lens materials that can be used in accordance with the disclosure, but does not discuss any silicone hydrogel materials. While Drew, Jr. et al. lists a number of types of polymers that can be used for the mold member including polybutylene terephthalate (PBT), only heat is used to cure or set the polymerizable lens blanks.

U.S. Pat. No. 6,075,066 issued to Matsuda et al., describes soft contact lenses made by crosslinking glycosoaminoglycan using photoirradiation in a single plastic mold, such as a PBT mold. The manufacturing methods described in Matsuda et al. include cut polishing, spin casting, pressing and molding, with spin casting being particularly preferred. In the spin-casting manufacturing method described, the lens forming material is crosslinked by directing UV light on the lens forming material while it remains in contact with the mold or after it has been separated from the single mold. In the case where the lens forming material is crosslinked while it remains in contact with the mold, as a single mold member is used the spin casting method, and the UV light is not directed through the single mold member in order to crosslink the lens forming material. If the lens forming material was crosslinked while in contact with the mold, the crosslinked lens and the mold are then soaked in an aqueous solution to swell the lens, allowing the lens to be detached from the single mold member used in the spin casting method.

U.S. Pat. No. 6,997,428 issued to Andino et al. is directed to contact lens molds made of a first UV transmissive section formed from a UV transmissive material which molds an optical surface of the lens, and a second UV opaque section formed from a UV opaque material which does not mold an optical surface of the lens. Andino et al. does not discuss any preference for mold materials beyond those that exhibit good adhesion to each other when the sections are combined to form a single mold member, and does not discuss the use of the molds to form any particular types of lens materials such as silicone hydrogels.

When contact lens mold assemblies made of thermoplastic polymer having high levels of UV light transmission such as polypropylene and ethylene-vinyl alcohol copolymers are used to cast mold silicone hydrogel contact lenses, it is common to use UV light to cure the polymerizable lens-forming composition to form a lens body. However, use of these thermoplastic polymers having high levels of UV light transmittance can present problems. For example, silicone hydrogel contact lens bodies cast molded in polypropylene typically require additional processing steps such as surface plasma treatments in order to make the lens surfaces adequately wettable, increasing the cost of manufacturing the lenses. Some polar thermoplastic polymers such as EVOH can be used to form mold members which produce silicone hydrogel lens bodies having acceptable wettable lens surfaces without application of a plasma surface treatment. However, materials such as EVOH materials are expensive, which negatively impacts production costs, and molds made of EVOH typically are harder and more brittle than would be ideal, which negatively impacts lens yields. Also, due to the high level of adhesion typically seen between EVOH molds and silicone hydrogels, it can be difficult if not impossible to dry demold and/or dry delens a silicone hydrogel lens body molded in EVOH, which can further increase manufacturing costs and reduce lens yields.

In view of the above, it can be appreciated that a need exists for contact lens molds comprising new types of materials for cast molding silicone hydrogel ophthalmic lenses using UV light to cure the lenses, new silicone hydrogel ophthalmic lenses cast molded and UV light cured using molds comprising these new types of materials, and associated manufacturing methods that use less expensive, more process-friendly molding materials. For example, these associated manufacturing methods may not require the use of expensive processing steps such as, for example, "wet" demolding steps, both "wet" demolding and "wet" delensing steps, and organic solvent-based washing steps, and which can produce high yields of ophthalmically acceptably wettable silicone hydrogel lens bodies, such as lens bodies which are ophthalmically acceptably wettable without application of a surface plasma treatment, without the presence of an interpenetrating network of a polymeric wetting agent, or both.

All publications, including patents, published patent applications, scientific or trade publications and the like, cited in this specification are hereby incorporated herein in their entirety.

SUMMARY

The present disclosure is directed to a method of manufacturing an ophthalmic lens. In one example, the method is a method of manufacturing a silicone hydrogel contact lens body, the method comprising: providing a first mold member and a second mold member, the first mold member comprising a concave molding surface configured to mold an anterior surface of a contact lens and the second mold member comprising a convex molding surface configured to mold a posterior surface of a contact lens, the molding surface of at least one of the first mold member and the second mold member comprising at least one thermoplastic polymer having a low level of UV transmittance of from about 0.01% to about 3.00%, the first mold member and the second mold member being configured to form a lens-shaped cavity therebetween when combined as a mold assembly; placing a polymerizable composition comprising a) at least one silicon-containing monomer, silicon-containing macromer, silicon-containing prepolymer, or any combination thereof, and b) at least one hydrophilic monomer in the first mold member; assembling the mold assembly by placing the second mold member in contact with the first mold member so as to form a lens-shaped cavity therebetween with the polymerizable composition contained in the lens-shaped cavity of the mold assembly; and directing UV light through the mold assembly into the lens-shaped cavity to cure the polymerizable composition in the mold assembly, forming a cast-molded polymerized reaction product in the lens-shaped cavity of the mold assembly, the polymerized reaction product comprising a silicone hydrogel contact lens body.

The at least one thermoplastic polymer having a low level of UV transmittance (low UV % T) can have a level of UV transmittance of from about 0.01% to about 2.00%, or from about 0.01% to about 1.00%, or from about 0.01% to about 0.50%, or from about 0.01% to about 0.30%, or from about 0.10% to about 0.25%, or from about 0.15% to about 0.20%.

The level of UV transmittance of the at least one thermoplastic polymer having low UV % T can be determined over a range of wavelengths from about 250 nanometers to about 800 nanometers, or from about 320 nanometers to about 420 nanometers. The level of UV transmittance can be determined for a particular wavelength, including 370 nanometers.

The level of UV transmittance of the at least one thermoplastic polymer having low UV % T can be determined using a sample of the thermoplastic polymer having a thickness of from about 0.4 mm to about 0.9 mm, or from about 0.5 mm to about 0.8 mm, or from about 0.6 mm to about 0.7 mm.

The step of directing the UV light can comprise delivering an intensity of UV light from about 20 $\mu W/cm^2$ to about 90 $\mu W/cm^2$, or from about 30 $\mu W/cm^2$ to about 80 $\mu W/cm^2$, or from about 40 $\mu W/cm^2$ to about 70 $\mu W/cm^2$ into the lens-shaped cavity of the mold assembly.

The at least one thermoplastic polymer having low UV % T can have a high level of UV light diffusivity, and can be effective to reduce the variation in UV light intensity in the lens-shaped cavity by at least 5%, or at least 10%, or at least 20%, or at least 30%, or at least 40%, or at least 50% during the step of directing UV light.

The at least one mold member formed of the thermoplastic polymer having low UV % T can be a unitary mold member, wherein the molding surface of the mold member and the non-molding portions of the mold member can be formed from a single piece of the at least one thermoplastic polymer.

The at least one mold member formed of the thermoplastic polymer having low UV % T can be formed completely by injection molding, or can be formed by a combination of injection molding and lathing, machining or ablating. For example, the non-molding portions of the mold member can be formed by injection molding, and the molding surface can be formed by lathing away a portion of the injection molded material. When the at least one mold member is formed by injection molding, the mold tool used to form the mold member can be maintained at a temperature from about 30° C to about 70° C during the injection molding.

The at least one thermoplastic polymer having a low level of UV transmission can comprise, can consist essentially of, or can consist of polybutylene terephthalate (PBT).

The method can further comprise a step of separating the mold assembly. The step of separating the mold assembly can be a dry demolding step using a dry demolding method which does not involve application of a liquid to the mold assembly containing the lens body, or can be a wet demolding step using a wet demolding method involving application of a liquid to the mold assembly containing the lens body.

The method can further comprise a step of releasing the lens body from the one and only one of the first mold member and the second mold member with which it remains in contact following the demolding step. The delensing step can be a dry delensing step using a dry delensing method which does not involve application of a liquid to the lens body and the mold member, or can be a wet delensing step using a wet delensing method involving application of a liquid to the lens body and the mold member.

The method can further comprise the step of hydrating the lens body. Following the hydration step, when fully hydrated, the lens body can have an advancing contact angle of less than about 100°, or less than about 90°, or less than about 80°, or less than about 70°.

The hydrophilic monomer of the polymerizable composition can comprises a hydrophilic monomer with an N-vinyl group.

The silicone hydrogel lens body can comprise a comfilcon A silicone hydrogel lens body.

The present disclosure is also directed to ophthalmic lens bodies. The ophthalmic lens body can be a silicone hydrogel contact lens body, comprising: a cast-molded polymerized lens body comprising the reaction product of a polymerizable composition, the polymerizable composition comprising a) at least one silicon-containing monomer, silicon-containing macromer, silicon-containing prepolymer or combinations thereof, and b) at least one hydrophilic monomer; wherein the lens body is a UV-cured cast-molded in a mold assembly comprising a first mold member and a second mold member, at least one molding surface of the first mold member and the second mold member comprising at least one thermoplastic polymer having a level of UV transmittance of from about 0.01% to about 3.00%; and the lens body has ophthalmically acceptably wettable anterior and posterior surfaces without application of a surface treatment to the lens body, or without the presence of an interpenetrating network (IPN) of a polymeric wetting agent in the lens body.

The present disclosure is also directed to a mold member for cast molding an ophthalmic lens body. The mold member can be a mold member for cast molding a silicone hydrogel contact lens body, wherein the mold member comprises at least one thermoplastic polymer having a level of UV transmittance of from about 0.01% to about 3.00% and an average polarity of from about 1% to about 7%.

Any and all of the preceding or following aspects/embodiments/features described herein and combinations of such aspects/embodiments/features set forth in claims, sentences or paragraphs are included within the scope of the present application provided that the aspects/embodiments/features of any such combination in any such order are not mutually inconsistent. In addition, any aspect/embodiment/feature or combination of aspects/embodiments/features may be specifically excluded from any example of the present disclosure.

DETAILED DESCRIPTION

Figure 1:
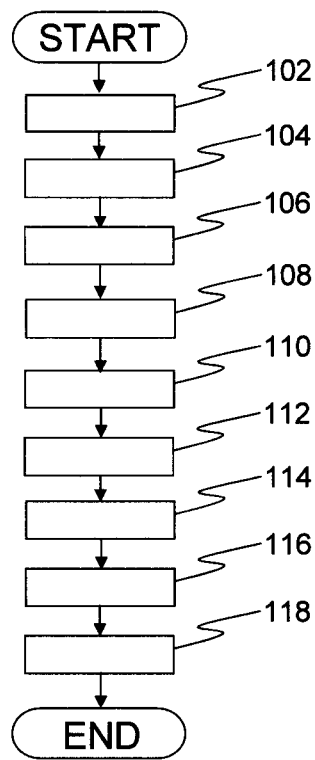
FIG. 1 is a flow chart illustrating steps of a method for producing an ophthalmic lens.

In cast molding methods of producing ophthalmic lenses, such as contact lenses, a reaction mixture or polymerizable lens precursor composition is cured in a lens shaped cavity defined by a first mold member with a concave molding surface and a second mold member with a convex molding surface, or a female and male mold member, respectively. Examples of thermoplastic polymers commonly used to make ophthalmic lens molds include polypropylene, polystyrene, polyethylene, ethylene-vinyl alcohol copolymers, and polyvinyl alcohol polymers. When cast molding a contact lens, after placing the polymerizable composition in the first mold member, the first and second mold members are placed together or coupled together to form a lens assembly with the lens shaped cavity therebetween. The mold assembly is then cured to polymerize the polymerizable composition, forming the polymerized lens body in the lens shaped cavity of the mold assembly.

It has been discovered that ophthalmic lens mold members formed of at least one thermoplastic polymer having low UV light transmittance can be used to cast mold silicone hydrogel lens bodies by curing the lens bodies using UV light. The molding surfaces of these ophthalmic lens molds formed from at least one thermoplastic polymer having low UV light transmittance (i.e., the regions of the mold members used to cast mold lens surfaces) likewise have low levels of UV light transmittance (low UV % T).

The at least one thermoplastic polymer having a low level of ultraviolet light transmittance can be a thermoplastic polymer having a level of UV light transmittance from about 0.01% T to about 3.00% T, or from about 0.01% T to about 2.00% T, or from about 0.01% T to about 1.00% T, or from about 0.01% T to about 0.50% T, or from about 0.01% T to about 0.30% T, or from about 0.10% T to about 0.25% T, or from about 0.15% T to about 0.20% T.

The level of UV light transmittance can be determined over a range of wavelengths including from about 250 nanometers to about 800 nanometers, or from about 320 nanometers to about 420 nanometers. The level of UV light transmittance can be determined for a particular wavelength, including 370 nanometers.

The sample of the thermoplastic polymer used to determine the level of UV light transmittance can have a thickness from about 0.4 mm to about 0.9 mm, or from about 0.5 mm to about 0.8 mm, or from about 0.6 mm to about 0.7 mm.

In one example, the level of UV light transmittance through a sample of thermoplastic polymer can be determined using a PerkinElmer Lambda 35 spectrophotometer (PerkinElmer, Waltham, Mass., USA). The settings used can include a range of 1100 nm to 190 nm, units of percent transmittance (% T), one or more cycles, a data interval of 2.0 nm, a scan speed of 480 nm/min, a slit size of 2.0 mm, no sample mask, and no smoothing.

The step of directing the UV light through the mold assembly to cure the polymerizable composition in the mold assembly can comprise directing UV light through an exterior surface of the mold assembly to deliver a particular intensity of UV light to the lens-shaped cavity within the mold assembly (i.e., providing a particular in-mold UV light intensity). The in-mold UV light intensity can be from about 20 $\mu W/cm^2$ to about 90 $\mu W/cm^2$, or from about 30 $\mu W/cm^2$ to about 80 $\mu W/cm^2$, or from about 40 $\mu W/cm^2$ to about 70 $\mu W/cm^2$.

In one example, the thermoplastic polymer having low UV % T can also have a high level of UV light diffusivity. Light diffusion occurs when photons travel through the material without being absorbed, but undergo repeated scattering effects which change the direction of their path. A thermoplastic polymer having low UV % T and high UV light diffusivity can reduce the variation of the intensity of UV light present in the lens-shaped cavity within the mold assembly when the intensity of UV light directed to an exterior surface of a mold assembly is varied over time, thereby "smoothing" the variation in level of light intensity which reaches the polymerizable composition. While the light intensity delivered to the exterior surface of the mold assembly may vary by plus or minus X % over a given time period, due to the diffusivity of the thermoplastic used to form the mold members of the mold assembly, the apparent variation in UV light intensity within the lens-shaped cavity can be less than plus or minus X % over the same time period. For example, a thermoplastic material having a medium level of diffusivity can reduce the variation in the light intensity from plus or minus 14% at the exterior surface of the mold assembly to plus or minus 12% within the lens-shaped cavity of the mold assembly, representing a 14% reduction in variation in light intensity. A thermoplastic material having a high level of diffusivity can reduce the variation in the light intensity from plus or minus 14% at the exterior surface of the mold assembly to plus or minus 10% within the lens-shaped cavity of the mold assembly, representing greater than 28% reduction in variation. In another example, a thermoplastic material having a light level of diffusivity can reduce the variation in the light intensity from plus or minus 14% at the exterior surface of the mold assembly to plus or minus 7% within the lens-shaped cavity of the mold assembly, representing a 50% reduction in variation. The thermoplastic polymer having low UV % T can reduce the variation in the light intensity between the exterior surface of the mold assembly and the lens-shaped cavity within the mold assembly. The thermoplastic polymer can reduce the variation in light intensity by at least 5%, or at least 10%, or at least 20%, or at least 30%, or at least 40%, or at least 50%.

The thermoplastic polymer having low UV % T can be a non-elastomeric thermoplastic polymer, i.e., a thermoplastic polymer which does not return to its original shape when a deforming force is removed.

The thermoplastic polymer having low UV % T used to form mold members as described herein can include one or more additives. The additives can be present in the thermoplastic as a mixture. In one example, the additives can be effective in allowing cured silicone hydrogel contact lens bodies to be dry demolded, dry delensed, or both dry demolded and delensed from molding surfaces comprising the thermoplastic polymer having low UV % T and the additive. The additives can be present in the thermoplastic as a mixture. In another example, the additives can be effective in increasing the yield of cosmetically acceptable cured silicone hydrogel contact lens bodies when dry demolded, dry delensed, or both dry demolded and delensed from molding surfaces comprising the thermoplastic polymer having low UV % T and the additive, as compared to the yield of cosmetically acceptable cured silicone hydrogel contact lens bodies when dry demolded, dry delensed, or both dry demolded and delensed from molding surfaces that are substantially identical but without the additive present. In yet another example, the additives can be effective in reducing the rate of lens deformation of cured silicone hydrogel contact lens bodies when dry demolded, dry delensed, or both dry demolded and delensed from molding surfaces comprising the thermoplastic polymer having low UV % T and the additive, as compared to the rate of lens deformation of cured silicone hydrogel contact lens bodies when dry demolded, dry delensed, or both dry demolded and delensed from molding surfaces that are substantially identical but without the additive present.

In a particular example, the additive present as a mixture with the thermoplastic polymer having low UV % T can comprise one or more forms of a fatty acid, such as, for example a free fatty acid, a fatty acid ester, a metal salt of a fatty acid, or any combination thereof. As used herein, a fatty acid is understood to be a long chained acyclic hydrocarbon (saturated or unsaturated) containing a carboxylic acid end group. The fatty acid can be present in the thermoplastic polymer having low UV % T in a concentration from about 0.001% to about 10%, from about 0.01% to about 5%, or from about 0.02% to about 3%.

The thermoplastic polymer having low UV % T can be essentially free of opaquing agents and UV absorbing agents, or can be free of opaquing agents and UV absorbing agents such as, for example, silicone rubber, carbon black, benzophenone, and the like.

The thermoplastic polymer having low UV % T having low levels of UV light transmittance used in the devices and methods described herein can be a polar thermoplastic polymer. For example, the polar thermoplastic polymer having low UV % T can have an average polarity of from about 1% to about 7%, an average polarity of from about 2% to about 5%, or an average polarity of from about 1% to about 4%, or of about 3%. Similarly, the molding surface of at least one of the first mold member and the second mold member formed of the thermoplastic polymer having low UV % T can have an average polarity of about 1% to about 7%, or from about 2% to about 5%, or from about 1% to about 4%, or of about 3%.

The average polarity of the thermoplastic polymer having low UV % T or of a molding surface can be determined using one or more standard tests or assays which are conventional and well known in the polymer art. One method of determining polarity is based on the Owens-Wendt-Rabel-Kaebel model, where the contact angle of the thermoplastic polymer having low UV % T is determined using a number of different liquids of known polarities. The Owens-Wendt-Rabel-Kaebel equation can be written in the form of a linear equation, where y is calculated based on the observed contact angle of each of the different liquids with the polymer ($\theta$) and x is calculated based on the known polar ($\sigma_L^P$) and disperse ($\sigma_L^D$) components of the total surface energy ($\sigma_L^T$) of each of the different liquids. The data points from the different liquids (x,y) can be plotted, and the linear regression of the plot can then be used to determine the slope (m) and y-intercept (b). The calculated slope and y-intercept can then be used to calculate the polar ($\sigma_S^P$) and disperse ($\sigma_S^D$) components of the total surface energy of the thermoplastic polymer having low UV % T ($\sigma_S^T$, where $\sigma_S^T = \sigma_S^P + \sigma_S^D$).

The Owens-Wendt-Rabel-Kaebel Equation in the form of a linear equation:

$$\frac{\sigma_L(\cos\theta + 1)}{2\sqrt{\sigma_L^D}} = \frac{\sqrt{\sigma_S^P}\sqrt{\sigma_L^P}}{\sqrt{\sigma_L^D}} + \sqrt{\sigma_S^D}$$

$$\text{where } y = \frac{\sigma_L(\cos\theta + 1)}{2\sqrt{\sigma_L^D}}, m = \sqrt{\sigma_S^P}, x = \frac{\sqrt{\sigma_L^P}}{\sqrt{\sigma_L^D}}, \text{ and } b = \sqrt{\sigma_S^D}.$$

Examples of the liquids with different polarities which can be used to determine average polarity of the thermoplastic polymer having low UV % T include, but are not limited to, deionized water, diiodomethane, dimethyl sulfoxide (DMSO), and formamide. In selecting the liquids with different polarities, ideally, a number of liquids having a range of polarities based on the liquid's polar component ($\sigma_L^P$) of total surface energy would be selected, rather than selecting a number of liquids with different total surface energies ($\sigma_L^T$). Using this method, the average polarity of the thermoplastic polymer having low UV % T is calculated by dividing the calculated polar component ($\sigma_S^P$) of total surface energy for the polymer by its calculated total surface energy ($\sigma_S^T$) and multiplying by 100 to obtain the percent polarity.

The thermoplastic polymer having low UV % T used in the devices and methods described herein can have an average total surface energy of less than or equal to about 32 mN/m, from about 32 mN/m to about 50 mN/m, or from about 32 mN/m to 42 mN/m. The average total surface energy can be determined using one or more standard tests or assays which are conventional and well known in the polymer art, including by a procedure based on the Owens-Wendt-Rabel-Kaebel model described above.

The thermoplastic polymer having low UV % T can have a low glass transition temperature. For example, the glass transition temperature can be below about 90° C, or below about 80° C, or below about 70° C, or below about 60° C, or below about 50° C, or of about 45° C. The glass transition temperature can be determined using one or more standard tests or assays which are conventional and well known in the polymer art. For example, the glass transition temperature can be determined using dilatometry, calorimetery (such as differential scanning calorimetry, DSC), as well as using standard test methods such as ISO 11357-1, -2, or -3, at a prescribed rate of heating such as 10° C/min.

The thermoplastic polymer having low UV % T as described herein can include any suitable polar group or groups. Of course the polymer should be suitable to be formed, for example, injection molded and the like, into ophthalmic lens mold members useful for the production of ophthalmic lenses, for example, contact lenses; intraocular lenses, corneal inlays, corneal onlays and the like. Examples of such polar groups include, without limitation, hydroxyl groups (—OH), carboxy groups (—COOH), amino groups (—NH, —NH$_2$), amide groups (—CONH$_2$, —(RCO)$_2$NH, —(RCO)$_3$N), and nitro groups (—NO$_2$).

An example of a thermoplastic polymer having a low level of UV light transmittance which can be used to form mold members for molding ophthalmic lenses in accordance with the present disclosure includes, but is not limited to, polybutylene terephthalate (PBT). Polybutylene terephthalate, a type of polyester, is a semi-crystalline thermoplastic polymer. PBT is commonly produced by the polymerization of butanediol and terephthalic acid. The homopolymer form of PBT has a melting point of about 223° C, and a glass transition temperature of about 60° C, although these values can vary somewhat based on the manufacturer of the material, the grade of material used, the method and heating rate used, etc. Both homopolymer and copolymer forms of PBT are suitable for injection molding and for use as described herein.

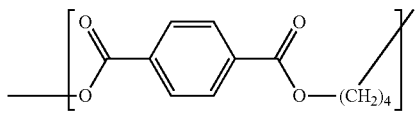

Poly(butylene-terephthalate)-PBT

In accordance with the present disclosure, the thermoplastic polymer having low UV % T can comprise or consist of or consist essentially of polybutylene terephthalate (PBT).

The mold members of the present disclosure can comprise or consist essentially of or can consist of the at least one thermoplastic polymer having low UV % T.

The mold members of the present disclosure can be unitary mold members wherein the molding surface of the mold member and the non-molding portions of the mold member are formed from a single piece of the at least one thermoplastic polymer.

Alternatively, the mold members of the present disclosure can be mold members formed by assembling separate components such as, for example, a separate molding surface and one or more separate non-molding regions. The molding surface of such a mold member can comprise at least one thermoplastic polymer having low UV % T, or the molding surface and at least one non-molding region of the mold member can comprise at least one thermoplastic polymer having low UV % T, or the molding surface and all the non-molding regions of the mold member can comprise at least one thermoplastic polymer having low UV % T.

The mold members described herein can comprise, include, consist essentially of, or consist of the thermoplastic polymer having low UV % Ts described in this disclosure. The mold members comprising the thermoplastic polymer having low UV % Ts described herein can further comprise one or more ingredients typically found in thermoplastic polymer having low UV % T compositions, such as, for example, plasticizers, anti-foaming agents, anti-static agents, extenders, and the like. The addition of such ingredients typically found in thermoplastic polymer having low UV % T compositions can be used to alter a property of the mold member formed from the polymers, or to improve the quality of the mold member formed from the polymers, including the quality of the molding surfaces of the mold members. Prior to use of the thermoplastic polymer having low UV % Ts or thermoplastic polymer having low UV % T compositions to form the mold members, the polymers or compositions can be exposed to treatments such as, for example, drying treatments to reduce water content. The use of such treatments on the polymers or compositions can alter the properties of the mold members formed from the polymers or compositions, or can increase the quality of the mold members formed from the polymers or compositions, including the quality of the molding surfaces of the mold members.

The mold member comprising the at least one thermoplastic polymer having low UV % T can be formed completely by injection molding. The mold member comprising the at least one thermoplastic polymer having low UV % T can be formed by a combination of injection molding and machining, lathing or ablating. For example, the non-molding portions of the mold member can be formed by injection molding, and the molding surface can be formed by lathing away a portion of the injection molded material.

The present mold members can be produced by conventional injection molding procedures known to persons of ordinary skill in the art. For example, a quantity of the polymer material disclosed herein can be heated to form a molten thermoplastic polymer having low UV % T. The molten thermoplastic polymer having low UV % T can be dispensed into a mold cavity in the shape of an ophthalmic lens mold. For example, the mold cavity can include one or two optical quality molding surfaces. The optical quality molding surfaces can be provided as components of one or more removable inserts located in a plate or other housing, or can be integrally machined as part of the molding cavity. The molten thermoplastic polymer having low UV % T in the mold cavity can then be cooled and separated from the molding machine to be moved to a station to receive a volume of the polymerizable composition. Alternatively, the present mold members can be produced by a combination of injection molding and machining, lathing or ablating, for example where the basic shape of the mold member is prepared by injection molding, and all or a portion of the optical quality molding surfaces are prepared by removing a portion of the mold member, for example by machining, lathing or ablating a portion of the mold member, such as all or a part of the region of the mold used to mold an optical zone of a contact lens.

For injection molding the thermoplastic polymer having low UV % T described herein, in one example, the mold tool used to form the mold member can be maintained at a temperature from about 30° C to about 70° C during the injection molding process. Additionally or optionally, one or more of the following injection molding conditions can be used: melt temperature from about 245° C and about 270° C, holding temperature from about 235° C to about 270° C, feed temperature from about 235° C to about 250° C, holding pressure from about 60 bar to about 125 bar, and injection speed from about 50 mm/sec. to about 125 mm/second through a 3 mm aperture.

In one example, a mold member comprising a thermoplastic polymer having low UV % T can produce an ophthalmically acceptably wettable ophthalmic lens, including, but not limited to, an ophthalmically acceptably wettable silicone hydrogel contact lens. The ophthalmically acceptably wettable ophthalmic lens can also be an ophthalmically compatible lens, such as, for example, an ophthalmically compatible silicone hydrogel contact lens.

As used herein, an "ophthalmically compatible silicone hydrogel contact lens" refers to a silicone hydrogel contact lens that can be worn on a person's eye without the person experiencing or reporting substantial discomfort, including ocular irritation and the like. Such lenses often have an oxygen permeability, a surface wettability, a modulus, a water content, an ionoflux, a design, and combinations thereof, which permit the lenses to be comfortably worn on a patient's eye for extended periods of time, such as for at least a day, at least a week, at least two weeks, or about a month without requiring removal of the lens from the eye. Typically, ophthalmically compatible silicone hydrogel contact lenses do not cause or are not associated with significant corneal swelling, corneal dehydration ("dry eye"), superior-epithelial arcuate lesions ("SEALs"), or other significant discomfort. Ophthalmically compatible silicone hydrogel contact lenses meet clinical acceptability requirements for daily wear or extended wear contact lenses.

Ophthalmically compatible silicone hydrogel contact lenses have ophthalmically acceptably wettable surfaces, although a lens with ophthalmically acceptably wettable surfaces may not necessarily be ophthalmically compatible. A silicone hydrogel contact lens having an ophthalmically acceptably wettable surface can be understood to refer to a silicone hydrogel contact lens that does not adversely affect the tear film of a lens wearer's eye to a degree that results in the lens wearer experiencing or reporting discomfort associated with placing or wearing the silicone hydrogel contact lens on an eye.

Ophthalmic lenses comprise lens bodies that have surfaces, such as an anterior surface and a posterior surface. As used herein, an ophthalmically acceptable wettable ophthalmic lens is a lens body with surfaces that are all ophthalmically acceptably wettable. Wettability refers to the hydrophilicity of one or more surfaces of a lens. As used herein, a surface of a lens can be considered wettable, or to be ophthalmically acceptably wettable, if the lens receives a score of 3 or above in a wettability assay conducted as follows. An ophthalmic lens is dipped into distilled water, removed from the water, and the length of time that it takes for the water film to recede from the lens surface is determined (e.g., water break up time (WBUT)). The assay grades lenses on a linear scale of 1-10, where a score of 10 refers to a lens in which a drop takes 20 seconds or more to fall from the lens. A lens having a WBUT of more than 5 seconds, such as at least 10 seconds or more desirably at least about 15 seconds, can be an ophthalmically acceptably wettable lens. Wettability can also be determined by measuring a contact angle on one or both lens surfaces. The contact angle can be a dynamic or static contact angle, a sessile drop contact angle, a pendant drop contact angle, or a captive bubble contact angle. Lower contact angles generally refer to increased wettability of a contact lens surface. For example, an ophthalmically acceptably wettable surface of a lens can have a contact angle less than or equal to about 120 degrees. The lenses of the present disclosure can have a contact angle less than about 100°, or less than about 90°, or less than about 80°, or less than about 70°.

As described herein, the ophthalmic lenses cast molded using the thermoplastic polymer having low UV % T can have ophthalmically acceptably wettable surfaces when fully hydrated, and may not require application of a surface treatment or the presence of an interpenetrating network of a polymeric wetting agent in the lens body in order for the lens to have ophthalmically acceptably wettable surfaces. However, application of a surface treatment to the lenses or the presence of an interpenetrating network of a polymeric wetting agent in the lens body can be used to further increase the wettability of the lens surfaces above a level that is considered ophthalmically acceptably wettable.

One measure of the ability of a mold member, including a mold member comprising a thermoplastic polymer having low UV % T, to mold as silicone hydrogel contact lens having ophthalmically acceptably wettable surfaces is the contact angle of the mold member. Contact angles can include dynamic or static contact angle, sessile drop contact angle, a pendant drop contact angle, or a captive bubble contact angle. In one example, the contact angle can be measured using the captive bubble method, and can be performed in purified water using a contact angle tester, such as Model CA-DT manufactured by Kyowa Kaimen Kagaku Co., Ltd. or a Kruss DSA 100 instrument (Kruss GmbH, Hamburg). The measurements can be performed at 25° C.

The process of cast molding a silicone hydrogel contact lens body typically begins with the preparation of a pair of mold members (i.e., a first mold member and a second mold member). The mold members can be produced by injection molding a thermoplastic polymer having low UV % T mold material into mold shaped cavities, by lathing the polymer mold material to form the entire mold member, or by a combination of injection molding and lathing, for example, injection molding to form the basic shape of the mold member and then lathing all or part of the lens forming region of the mold member.

In one example, the mold members formed from the thermoplastic polymer having low UV % T described herein can be single piece mold members, i.e., the molding surface and non-molding portions of the mold member are formed of the same thermoplastic polymer(s) and are unitary. Alternatively, the mold members can be multiple piece mold members, i.e., one or more pieces are formed separately and are physically combined to form a single mold member, such as, for example, a molding surface is formed and placed within with a pre-formed non-molding portion to form a single mold member. Two or more single mold members (e.g., a male mold member and a female mold member) can then be combined to form a molding assembly.

Typically, two mold members are combined to cast mold contact lens bodies. The two mold members are sized and structured to be assembled together to define a lens-shaped cavity therebetween. Each of the two mold members can comprise either a concave molding surface used to mold an anterior surface of a lens, or a convex molding surface used to mold a posterior surface of a lens. For the purposes of this disclosure, the mold member with a concave molding surface is referred to as a first mold member or a female mold member, and the mold member with a convex molding surface is referred to as a second mold member or a male mold member. The first and second mold members can be structured to form a lens-shaped cavity therebetween when assembled with each other to form a mold assembly. Alternative mold member configurations, such as, for example, mold assemblies comprising more than two mold members or mold members that are shaped or structured differently than described above, can be used with the thermoplastic polymer having low UV % T mold materials described herein. Additionally, the mold members can be configured to comprise more than one lens forming region. For example, a single mold member can be configured to comprise a region configured to mold an anterior lens surface as well as a posterior lens surface, i.e., to act as either a female or male mold member.

At least one thermoplastic polymer having low UV % T can be used to form at least one mold member, e.g., a first mold member or a second mold member, or can be used to form both mold members e.g., the first mold member and the second mold member. Most commonly the level of UV light transmittance of the first mold member and the second mold member will be approximately the same, such as within 20% or 10% or 5% or less of each other.

As previously discussed, when the thermoplastic polymer having low UV % T materials described herein are used to make mold members configured to form a lens-shaped cavity therebetween as a mold assembly, the process of assembling the mold members into a mold assembly can further comprise the step of forming a connection of some sort between the mold members. The first mold member and the second mold member can be structured to be easily separated after being assembled together, preferably without causing substantial damage to at least one of the first and second mold members, and to an ophthalmic lens product produced in the lens shaped cavity. In one example, the mold members can be configured to form a mechanical connection based on the shape of elements of the mold members, such as an interference fit between the mold members, threading between the mold members, bores and protrusions between the mold members, or other locking structures. In another example, a weld can be formed between the mold members by melting a region of one or more of the mold members. In yet another example, an adhesive substance such as a form of glue, contact cement or sealant can be used to form a bond between the mold members. In yet another example, the mold members can be joined using an additional element such as a clip, clamp or bracket. Regardless of the type of connection used between the mold members, the connection is intended to keep the mold members in alignment during the curing process, and needs to be capable of being released before the demolding process or as part of the demolding process.

During the process of manufacturing a lens body, before the individual mold members are combined to form a mold assembly, the polymerizable lens forming composition is filled into the mold members. Typically this is accomplished by placing a predetermined quantity of the polymerizable composition into the concave molding surface of the first mold member. The mold assembly is then assembled by placing the convex molding surface of the second mold member in contact with the first mold member such that a lens-shaped cavity is formed between the first and second mold members, the lens-shaped cavity containing the polymerizable composition. If used, the connection is then formed between first and second mold members by whatever means is being used in order to maintain the mold members in proper alignment during the curing process. As previously described, the process of forming the connection can comprise, for example, welding the mold members together, gluing the mold members together, applying pressure to the mold members to engage an interference fit, threading the mold members together, applying a clamp to the mold members, etc.

The mold assembly including the polymerizable composition is then cured in the lens-shaped cavity to form a lens body. As described herein, curing comprises directing ultraviolet (UV) light through the exterior surface of the mold assembly and into the lens-shaped cavity within the mold assembly to the polymerizable composition in order to cause polymerization of the polymerizable composition in the lens-shaped cavity of the mold assembly. In addition to UV light, one or more additional forms of electromagnetic radiation can be used to cure the polymerizable composition, such as, for example, thermal radiation, visible light, microwave radiation, etc. Two or more levels of UV light, or two or more levels of an additional form of electromagnetic radiation can be used to cure the mold assemblies. The curing process typically involves curing the mold assembly until the polymerizable composition has polymerized sufficiently such that the lens body will retain the shape of the lens-shaped cavity following demolding and delensing. As such, the curing process may not result in complete reaction of all the polymerizable components of the polymerizable composition.

As used herein, "demolding" refers to the process of separating the molding surfaces or mold members of the mold assembly following curing of the polymerizable composition. As a result of the demolding process, the molding surfaces or mold members are separated from each other, and the device body remains in contact with, or attached to, or adhered to one and only one of the molding surfaces or mold members used to cast mold the device body.

Either "wet" or 'dry" demolding methods can be used to separate the mold members of the mold assembly. As previously discussed, a wet demolding method involves application of a liquid to a mold assembly including a polymerized lens body. When a wet demolding method is used, ultrasonic energy can optionally be applied to the liquid and the mold assembly to assist with the demolding process.

Dry demolding processes involve the use of mechanical processes to separate the two mold members of the mold assembly, the assembly including the polymerized lens body. In dry demolding processes, the mold assembly including the polymerized lens body is not contacted with a liquid, such as an organic solvent, water or an aqueous solution during the demolding process, and typically the mold assembly including the polymerized lens body has not been exposed to a liquid prior to the dry demolding process. Following a dry demolding process, the polymerized lens body remains in contact with one, and only one, of the two mold members used to mold the lens body. In one example, a dry demolding process may include squeezing one or more of the mold members to deform the mold member(s) and to separate the two mold members, leaving the polymerized lens body in contact with one of the two mold members. If the mold members of the mold assembly are held together at least in part by an interference fit between the two mold members, a dry demolding process may include applying pressure to one or both of the mold members in order to push the mold members away from each other to break the interference fit. If the mold members of the mold assembly are held together at least in part by a weld between the two mold members, dry demolding may include cutting through the welded material.

It may be desired to have the lens body remain in contact with a particular mold member, such as either the first or the second mold member, following the demolding process. In order to help the lens body remain in contact with the desired mold member, heat can be applied to the first or second mold member, for example, by blowing heated air on the back of the mold member. Alternatively, the first or second mold member can be chilled, for example by blowing chilled air on the back of the mold member. An application of pressure to either the first or second mold member before demolding or concurrently with the demolding process can also help the lens body to remain in contact with a particular mold member (i.e., the first or second mold member) following the demolding process.

"Delensing" refers to the process of releasing the device body from the one molding surface or mold member with which the device body remains in contact after the molding surfaces or mold members of the mold assembly have been separated in a demolding process. As used herein, "delensing" may refer to a process involving any ophthalmic device body, including an ocular insert body or a contact lens body.

Either "wet" or 'dry' delensing methods can be used to separate the lens body from the one and only one mold member (i.e., the first or second mold member) with which it remains in contact following the demolding step. As previously discussed, a wet delensing method involves application of a liquid to the polymerized lens body and the one and only one mold member. When a wet delensing method is used, ultrasonic energy can optionally be applied to the liquid and the one and only one mold member as part of the delensing process to assist in release of the lens body from the one and only one mold member. Following the wet delensing, the released lens body can be immediately transferred to a package or tray and inspected, or can optionally be allowed to sit in the liquid used for the wet delensing (such as, for example, deionized water) for a period of time, for example to allow the released lens to partially or fully hydrate. The temperature of the delensing liquid can also be controlled during the delensing process and optional sitting time.

Dry delensing processes involve the use of mechanical processes to release the lens body from the one remaining mold member with which the lens body is in contact following the demolding step. In dry delensing processes, the lens body and the one remaining mold member with which the lens body is in contact are not contacted by a liquid, such as water or an aqueous solution, as part of the delensing process. While it is possible that a wet demolding process (involving application of a liquid to a mold assembly including a polymerized lens body) may be used prior to a dry delensing process, it is more common to use a dry demolding process prior to a dry delensing process. When a dry demolding process and a dry delensing process are used together, the lens body has not been exposed to a liquid, for example an organic solvent, water or an aqueous solution, until after the lens body has been released from both mold members of the mold assembly (i.e., released from both the first and second mold members). In one example, a dry delensing process may involve the use of a vacuum apparatus to lift the polymerized lens body from the one remaining mold member with which it was in contact following the demolding step. A dry delensing process may also involve squeezing the one remaining mold member to at least partially break the bond between the one mold member. A dry delensing process may involve inserting a prying tool between the edge of the lens body and the mold member to at least partially break the bond between the lens body and the mold member.

When a dry demolding process, a dry delensing process, or both a dry demolding process and a dry delensing process are used, the thermoplastic polymer having low UV % T used to form at least the molding surface of at least one of the mold members of the mold assembly can comprise polybutylene terephthalate (PBT), including mixtures of PBT with an additive, such as, for example, a form of fatty acid. The form of fatty acid can include free fatty acids, fatty acid esters, metal salts of fatty acids, and combinations thereof.

The silicone hydrogel lens bodies cast molded using mold members formed of a thermoplastic polymer having low UV % T may not require the use of one or more organic solvent-based washing steps in order for the resulting lens bodies to be ophthalmically acceptably wettable, although organic solvent-based washing steps can be used to increase wettability or for other purposes. For example, these silicone hydrogel lens bodies are ophthalmically acceptably wettable following washing in aqueous solutions, including aqueous solutions that are essentially free of an organic solvent such as a volatile alcohol. Examples of volatile alcohols include forms of methanol, ethanol, propanol, etc. The aqueous solutions essentially free of an organic solvent used to wash the present lenses can include aqueous salt solutions, buffer solutions, surfactant solutions, wetting agent solutions, comfort agent solutions, combinations thereof, and the like. In one example, one or more polymeric wetting agents or comfort agents can be used to wash the present lenses. However, it is understood that the present lenses have ophthalmically acceptably wettable surfaces when washed in an aqueous solution that does not contain any polymeric wetting agents or comfort agents. Thus, while the polymeric wetting agents or comfort agents may be used to increase the wettability of the present lenses, their wettability is not dependent solely upon the use of such agents.

While the use of organic solvent-based washing steps is not necessary to the make lenses described herein ophthalmically acceptably wettable, one or more such steps can be used on the present lenses, for example, to clean the lens bodies by removing dust or debris; to extract the lens bodies by removing unreacted or partially reacted monomers, macromers or prepolymers, or other materials; or to partially hydrate the lenses (when an aqueous solution of an organic solvent is used). Additionally, one or more organic solvent-based washing steps can be performed on the present lens bodies in order to increase the wettability of the lens bodies to a level above the ophthalmically acceptably wettable level achieved based on the use of the mold materials having low UV % T described herein in molding the lens bodies.

As used herein, the term "hydrogel" refers to a polymeric material, typically a network or matrix of polymer chains, capable of swelling in water or becoming swollen with water. A hydrogel can also be understood to be a material that retains water in an equilibrium state. The network or matrix may or may not be cross-linked. Hydrogels refer to polymeric materials, including contact lenses that are water swellable or are water swelled. Thus, a hydrogel may be (i) unhydrated and water swellable, or (ii) partially hydrated and swollen with water, or (iii) fully hydrated and swollen with water. The hydrogel may be a silicone hydrogel, a silicone-free hydrogel, or an essentially silicone-free hydrogel.

The term "silicone hydrogel" or "silicone hydrogel material" refers to a particular hydrogel that includes a silicon (Si)-containing component or a silicone (SiO)-containing component. For example, a silicone hydrogel is typically prepared by combining a silicon-containing material with conventional hydrophilic hydrogel precursors. A silicone hydrogel contact lens is a contact lens, including a vision correcting contact lens, which comprises a silicone hydrogel material.

A "silicon-containing" component is a component that contains at least one silicon (Si) atominkage. The silicon-containing component can be a monomer, macromer or prepolymer. In one example, one or more silicon atoms in the silicon-containing component may optionally possess in some manner, for example, may optionally be chemically, such as covalently, bonded to, one or more organic radical substituents (R1, R2) or substituted organic radical substituents. The organic radical substituents or substituted organic radical substituents may be the same or different, e.g., —$SiR_1R_2O$—.

"Molecular mass" in the context of a polymer described herein refers to the nominal average molecular mass of a polymer, typically determined by size exclusion chromatography, light scattering techniques, or intrinsic viscosity determination in 1,2,4-trichlorobenzene. Molecular weight in the context of a polymer can be expressed as either a number-average molecular weight or a weight-average molecular weight, and in the case of vendor-supplied materials, will depend upon the supplier. Typically, the basis of any such molecular weight determinations can be readily provided by the supplier if not provided in the packaging material. Typically, references herein to molecular weights of monomers, macromers, pre-polymers or polymers herein refer to the weight average molecular weight. Both molecular weight determinations, number-average and weight-average, can be measured using gel permeation chromatographic or other liquid chromatographic techniques. Other methods for measuring molecular weight values can also be used, such as the use of end-group analysis or the measurement of colligative properties (e.g., freezing-point depression, boiling-point elevation, or osmotic pressure) to determine number-average molecular weight or the use of light scattering techniques, ultracentrifugation or viscometry to determine weight-average molecular weight.

A "network" or "matrix" of a hydrophilic polymer typically means that crosslinks are formed between polymer chains by covalent bonds or by physical bonds, e.g. hydrogen bonds. A network can include two or more polymeric components, and can include an interpenetrating network (IPN) in which one polymer is physically entangled with a second polymer such that there are few, if any, covalent bonds between them, but the polymers cannot be separated from each other without destroying the network.

A "hydrophilic" substance is one that is water-loving or has an affinity for water. Hydrophilic compounds have an affinity to water and are usually charged or have polar moieties or groups that attract water.

A "hydrophilic polymer" as used herein is defined as a polymer having an affinity for water and capable of absorbing water. A hydrophilic polymer is not necessarily soluble in water. A hydrophilic polymer may be soluble in water or insoluble, e.g., substantially insoluble, in water.

A "hydrophilic component" is a hydrophilic substance that may or may not be a polymer. Hydrophilic components include those that are capable of providing at least from about 20% (w/w), for example, at least from about 25% (w/w) water content to the resulting hydrated lens when combined with the remaining reactive components. A hydrophilic component can include hydrophilic monomers, hydrophilic macromers, hydrophilic prepolymers, hydrophilic polymers, or combinations thereof. Hydrophilic macromers, hydrophilic prepolymers, and hydrophilic polymers may also be understood to have hydrophilic portions and hydrophobic portions. Typically, the hydrophilic portion and the hydrophobic portion are present in relative amounts such that the macromers, prepolymers, or polymers are hydrophilic.

A "monomer" refers to a relatively low molecular weight compound, for example a compound with an average molecular weight less than or equal to about 700 Daltons that is polymerizable. In one example, a monomer can comprise a single unit of a molecule containing one or more functional groups capable of polymerizing to combine with other molecules to form a polymer, the other molecules being of the same structure or different structures as the monomer.

A "macromer" refers to medium and high molecular weight compounds or polymers, which can contain one or more functional groups capable of polymerization or further polymerization. For example, a macromer can be a compound or polymer with an average molecular weight of from about 700 Daltons to about 2,000 Daltons.

A "prepolymer" refers to a polymerizable or crosslinkable higher molecular weight compound. A prepolymer, as used herein can contain one or more functional groups. In one example, a prepolymer can be a series of monomers or macromers bonded together such that the overall molecule remains polymerizable or crosslinkable. For example, a prepolymer can be a compound with an average molecular weight greater than or equal to about 2,000 Daltons.

A "polymer" refers to a material formed by polymerizing one or more monomers, macromers, prepolymers or mixtures thereof. As used herein, a polymer is understood to refer to a molecule that is not capable of being polymerized, but is capable of being crosslinked to other polymers, for example, to other polymers present in a polymerizable composition or during the reaction of monomers, macromers and/or prepolymers to form other polymers in a polymerizable composition.

An "interpenetrating network" or "IPN" refers to a combination of two or more different polymers, in network form, of which at least one is synthesized (e.g., polymerized) and/or cross-linked in the presence of the other without or substantially without any covalent bonds between them. An IPN can be composed of two kinds of chains forming two separate networks, but in juxtaposition or interpenetrating. Examples of IPNs include sequential IPNs, simultaneous IPNs, semi-IPNs and homo-IPNs.

A "pseudo IPN" refers to a polymeric reaction product where at least one of the different polymers is cross-linked while at least one other polymer is non-crosslinked (e.g. linear or branched), wherein the non-cross-linked polymer is distributed in and held by the cross-linked polymer on a molecular scale such that the non-cross-linked polymer is substantially unextractable from the network.

A "polymeric mixture" refers to a polymeric reaction product wherein different polymers are either linear or branched, substantially without cross-linking, wherein the resulting polymeric blend that is obtained is a polymer mixture on a molecular scale.

A "graft polymer" refers to a branched polymer having side chains comprising a homopolymer or copolymer different to that of the main chain.

"Attach" can refer to any of charge attachment, graft, complex, bond (chemical bond or hydrogen), or adhere, unless specified otherwise.

As used herein, an "ophthalmically acceptable lens forming component" refers to a lens forming component that can be incorporated into a hydrogel contact lens without the lens wearer experiencing or reporting substantial discomfort, including ocular irritation and the like. Ophthalmically acceptable hydrogel contact lenses have ophthalmically acceptable surface wettabilities, and typically do not cause or are not associated with significant corneal swelling, corneal dehydration ("dry eye"), superior-epithelial arcuate lesions ("SEALs"), or other significant discomfort.

The term "organic solvent" refers to an organic substance which has the ability to solvate or dissolve at least one material, for example and without limitation, unreacted materials, diluents and the like, present in a contact lens body which has not previously been subjected to extraction processing. In one example, the material is a material that is not soluble or does not dissolve in water or an aqueous solution. In another example, the material is a material that is not as soluble or does not dissolve as much in water or an aqueous solution, i.e., the material has increased solvation in the organic solvent as compared to water or an aqueous solution. Thus, the organic solvent in contact with such an unextracted contact lens body is effective to solvate or dissolve at least one material present in the lens body, or to increase the solvation or dissolve to a greater extent the at least one material present in the lens body to reduce the concentration of the at least one material in the lens body, or to reduce the concentration of the at least one material in the lens body as compared to a lens body treated with water or an aqueous solution. The organic solvent may be used without dilution, that is 100% organic solvent, or may be used in a composition including less than 100% organic solvent, for example and without limitation, an aqueous solution including an organic solvent. In general, an organic solvent acts, for example, directly acts, on the at least one material to solvate or dissolve the at least one material. Examples of volatile organic solvents include, without limitation, alcohols, e.g., alkanols, such as ethanol, isopropanol and the like, chloroform, butyl acetate, tripropylene glycol methyl ether, dipropylene glycol methyl ether acetate, and the like and mixtures thereof.

The term "surfactant" or "surfactant component" refers to a substance which has the ability to reduce the surface tension of water, for example, water or an aqueous solution in which the substance is present. By reducing the surface tension of the water, the surfactant or surfactant component facilitates the water containing the surfactant or surfactant component, when in contact with a contact lens body which has not previously been subjected to extraction processing with an organic solvent, to more intimately contact the lens body and/or more effectively wash or remove at least one material present in the lens body from the lens body relative to the water without the surfactant or surfactant component. Generally, a surfactant or surfactant component does not act directly on the at least one material to solvate or dissolve the at least one material. Examples of surfactants or surfactant components include, without limitation, zwitterionic surfactants including forms of betaine, non-ionic surfactants including forms of polysorbate such as polysorbate 80, forms of poloxamers or poloxamines, fluorinated surfactants, and the like and mixtures thereof. In one example, one or more surfactants can be incorporated into the polymerizable compositions described herein, in washing liquids described herein, in the packaging solutions described herein, and combinations thereof.

Additional definitions may also be found in the sections that follow.

Lens formulations. Hydrogels represent one class of materials used for the present contact lenses. Hydrogels comprise a hydrated, cross-linked polymeric system containing water in an equilibrium state. Accordingly, hydrogels are copolymers prepared from one or more reactive ingredients. The reactive ingredients are crosslinkable with a crosslinking agent.

Hydrophilic monomer. The hydrophilic monomer can be, for example, a silicon-containing monomer having a hydrophilic portion, a hydrophilic silicone-free monomer, or a combination thereof. The hydrophilic monomer can be used in combination with a hydrophobic monomer. The hydrophilic monomer can be a monomer having both hydrophilic and hydrophobic portions or moieties. The type and amount of hydrophilic monomer used in the polymerizable lens composition can vary depending on the types of other lens-forming monomers that are used. Non-limiting illustrations are provided herein with respect to hydrophilic monomers for use in silicone hydrogels.

Crosslinking Agent. Crosslinking agents for the monomers, macromers, or prepolymers, used in preparing the hydrogels can include those that are known in the art, and examples of the crosslinking agents are also provided herein. Suitable crosslinking agents include, for example, a diacrylate- (or divinyl ether-) functionalized ethylene oxide oligomer or monomer, such as, for example, tri(ethylene glycol)dimethacrylate (TEGDMA) tri(ethylene glycol)divinyl ether (TEGDVE), ethylene glycol dimethacrylate (EGDMA), and trimethylene glycol dimethacrylate (TMGDMA). Typically, the crosslinking agents are present in the polymerizable silicone hydrogel composition in relatively small total amounts in the polymerizable composition, such as in an amount ranging from about 0.1% (w/w) to about 10% (w/w), or from about 0.5% (w/w) to about 5% (w/w), or from about 0.75% (w/w) to about 1.5% (w/w), by weight of the polymerizable composition.

In one example, one or more of the monomers, macromers or prepolymers may comprise crosslinking functionality. In such cases, the use of an additional crosslinker in addition to the monomer, macromer or prepolymer with crosslinking functionality is optional, and the monomer, macromer or prepolymer with crosslinking functionality may be present in the polymeriziable silicone hydrogel composition in a larger amount, such as, for example, at least about 3% (w/w), at least about 5% (w/w), at least about 10% (w/w), or at least about 20% (w/w).

Silicone Hydrogel Polymerizable Lens Forming Composition. A silicone hydrogel polymerizable lens forming composition can comprise at least one silicon-containing component and at least one compatible hydrophilic monomer. In one example, the polymerizable composition can further comprise at least one compatible crosslinking agent. In particular examples, the silicon-containing component may act as both a crosslinker and as a silicon-containing component. With respect to polymerizable compositions as discussed herein, "compatible" components refers to components which, when present in a polymerizable composition prior to polymerization, form a single phase that is stable for a duration of time adequate to allow manufacture of a polymerized lens body from the composition. For some components, a range of concentrations may be found to be compatible. Additionally, "compatible" components are components which, when polymerized to form a polymerized lens body, produce a lens that has adequate physical characteristics to be used as a contact lens (e.g., adequate transparency, modulus, tensile strength, etc.)

Silicon-containing component. When a silicon atom of a silicon-containing compound is bonded to an oxygen atom, the Si and attached 0 portion (Si—O portion) of the silicon-containing component can be present in the silicon-containing component in an amount greater than or equal to 20% (w/w), for example greater than or equal to 30% (w/w), of the total molecular weight of the silicon-containing component. Useful silicon-containing components comprise polymerizable functional groups such as vinyl, acrylate, methacrylate, acrylamide, methacrylamide, N-vinyl lactam, N-vinylamide, and styryl functional groups. The silicon-containing component from which the present contact lenses may be obtained, for example, by polymerization, include one or more silicon-containing monomers, one or more silicon-containing macromers, one or more silicon-containing prepolymers, or mixtures thereof. Silicone hydrogel contact lenses produced as described herein can be based on a silicon-containing monomer and/or a silicone-based macromer and/or a silicone-based prepolymer, and a hydrophilic monomer or co-monomer, and a crosslinking agent. In addition to the other silicon-containing compounds described herein, examples of still further silicon-containing components that may be useful in the present lenses can be found in U.S. Pat. Nos. 3,808,178, 4,120,570, 4,136,250, 4,139,513, 4,153,641, 4,740,533, 5,034,461, 5,496,871, 5,959,117, 5,998,498, and 5,981,675, and U.S. Pat. Application Publication Nos. 2007/0066706 A1, 2007/0296914 A1, and 2008/0048350 A1, all of which are incorporated in their entireties herein by reference. The silicon-containing component can be a silicon-containing monomer or a silicon-containing macromer or a silicon-containing prepolymer.

A silicon-containing monomer, macromer, or prepolymer can have, for example, the following general structure (I):

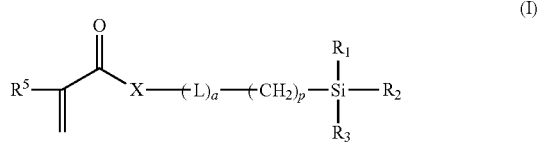

where $R^5$ is H or $CH_3$, X is O or $NR^{55}$ where $R^{55}$ is H or a monovalent alkyl group with 1 to 4 carbon atoms, a is 0 or 1, L is a divalent linking group which comprises from 1 to 20 carbon atoms, or from 2 to 10 carbon atoms, which can also optionally comprise ether and/or hydroxyl groups, for example, a polyethylene glycol chain, p can be from 1 to 10, or from 2 to 5, $R_1$, $R_2$, and $R_3$ can be the same or different and are groups independently selected from hydrocarbon groups having 1 to about 12 carbon atoms (e.g., methyl groups), hydrocarbon groups substituted with one or more fluorine atoms, a siloxanyl group, and siloxane chain-containing moieties, wherein at least one of $R_1$, $R_2$, and $R_3$ comprises at least one siloxane unit (—OSi). For example, at least of one of $R_1$, $R_2$, and $R_3$ can comprise —OSi$(CH_3)_3$ and/or —OSi$(R^{52}R^{53}R^{54})$ where $R^{52}$, $R^{53}$ $R^{54}$ are independently ethyl, methyl, benzyl, phenyl or a monovalent siloxane chain comprising from 1 to about 100, or from about 1 to about 50, or from about 1 to about 20, repeating Si—O units.

One, two, or all three of $R_1$, $R_2$, and $R_3$ can also comprise other siloxanyl groups or siloxane chain-containing moieties. The combined linkage of —X-L-, where present in a silicon-containing monomer, macromer or prepolymer of structure (I), can contain one or more heteroatoms that are either O or N. The combined linkage can be straight chain or branched, where carbon chain segments thereof can be straight chain. The combined linkage of —X-L- can optionally contain one or more functional groups selected from, e.g., carboxyl, amide, carbamate, and carbonate. Examples of such combined linkages are provided, for example, in U.S. Pat. No. 5,998,498 and U.S. Pat. Application Publication Nos. 2007/0066706 A1, 2007/0296914 A1, and 2008/0048350, all the disclosures of which are incorporated herein by reference. The silicon-containing monomer, macromer or prepolymer used in accordance with the present disclosure can comprise a single unsaturated or acryloyl group, such as shown in structure (I), or optionally can possess two unsaturated or acryloyl groups, such as one at each terminus of the monomer, monomer or prepolymer. Combinations of both types of the silicon-containing monomers, macromers or prepolymers optionally can be used in polymerizable compositions useful in accordance with the present disclosure.

Examples of silicon-containing components useful in accordance with the present disclosure include, for example and without limitation, polysiloxanylalkyl(meth)acrylic monomers, macromers or prepolymers including, without limitation, methacryloxypropyl tris(trimethylsiloxy)silane, pentamethyldisiloxanyl methylmethacrylate, and methyldi (trimethylsiloxy)methacryloxymethyl silane.

Specific examples of the useful silicon-containing monomers, macromers or prepolymers can be, for example, 3-[tris(trimethylsilyloxy)silyl]propyl methacrylate ("Tris" available from Gelest, Morrisville, Pa., USA), and monomethacryloxypropyl terminated polydimethylsiloxane ("MCS-M11" available from Gelest, Morrisville, Pa., USA). Examples of some silicon-containing monomers are disclosed in US Patent Application Publication No. 2008/0269429. These silicon-containing monomers can have an alkylene group as a divalent linkage group (e.g., —$(CH_2)_p$—) and "a" can be 0 with reference to structure (I), and at least two siloxanyl groups. These silicon-containing components are designated herein as Structure (A) class silicon-containing monomers. Exemplary non-limiting structures of these silicon-containing monomers are shown as follows:

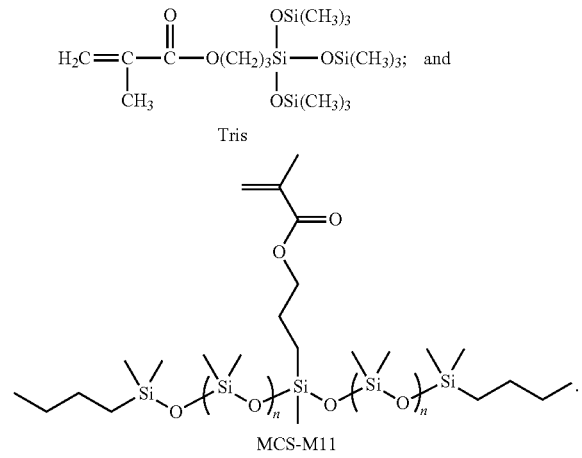

Other specific examples of silicon-containing components useful in the present disclosure can be, for example, 3-methacryloxy-2-hydroxypropyloxy)propylbis(trimethylsiloxy) methylsilane ("SiGMA", available from Gelest, Morrisville, Pa., USA) and methyldi(trimethylsiloxy)sylylpropylglycerolethyl methacrylate ("SiGEMA"). These silicon-containing components include at least one hydroxyl group and at least one ether group in the divalent linking group L shown in structure (I) and at least two siloxanyl groups. These silicon-containing components are designated herein as Structure (B) class silicon-containing components. Additional details on this class of silicon-containing components are provided, for example, in U.S. Pat. No. 4,139,513, which is incorporated in its entirety herein by reference. SiGMA, for example, can be represented by the following exemplary non-limiting structure:

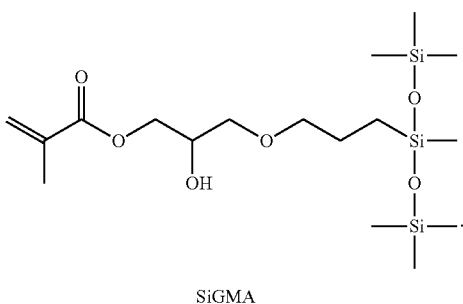 [SMILES: C=C(C)C(=O)OCC(O)COCCC[Si](C)(O[Si](C)(C)C)O[Si](C)(C)C]

SiGMA

Silicon-containing components of Structures (A) and (B) can be used individually or in any combinations thereof in at least one silicone-free hydrophilic monomer such as described herein. If used in combination, for example, the amount of silicon-containing components of Structure (A) can be, for example, from about 10% (w/w) to about 40% (w/w), or from about 15% (w/w) to about 35% (w/w), or from about 18% (w/w) to about 30% (w/w). The amount of silicon-containing components of Structure (B) can be, for example, from about 10% (w/w) to about 45% (w/w), or from about 15% (w/w) to about 40% (w/w), or from about 20% (w/w) to about 35% (w/w).

Other specific examples of the useful silicon-containing components useful in accordance with the present disclosure can be chemicals represented by the following formulas, or chemicals described in Japanese patent application publication number 2008-202060A, which is hereby incorporated by reference in its entirety, for example,

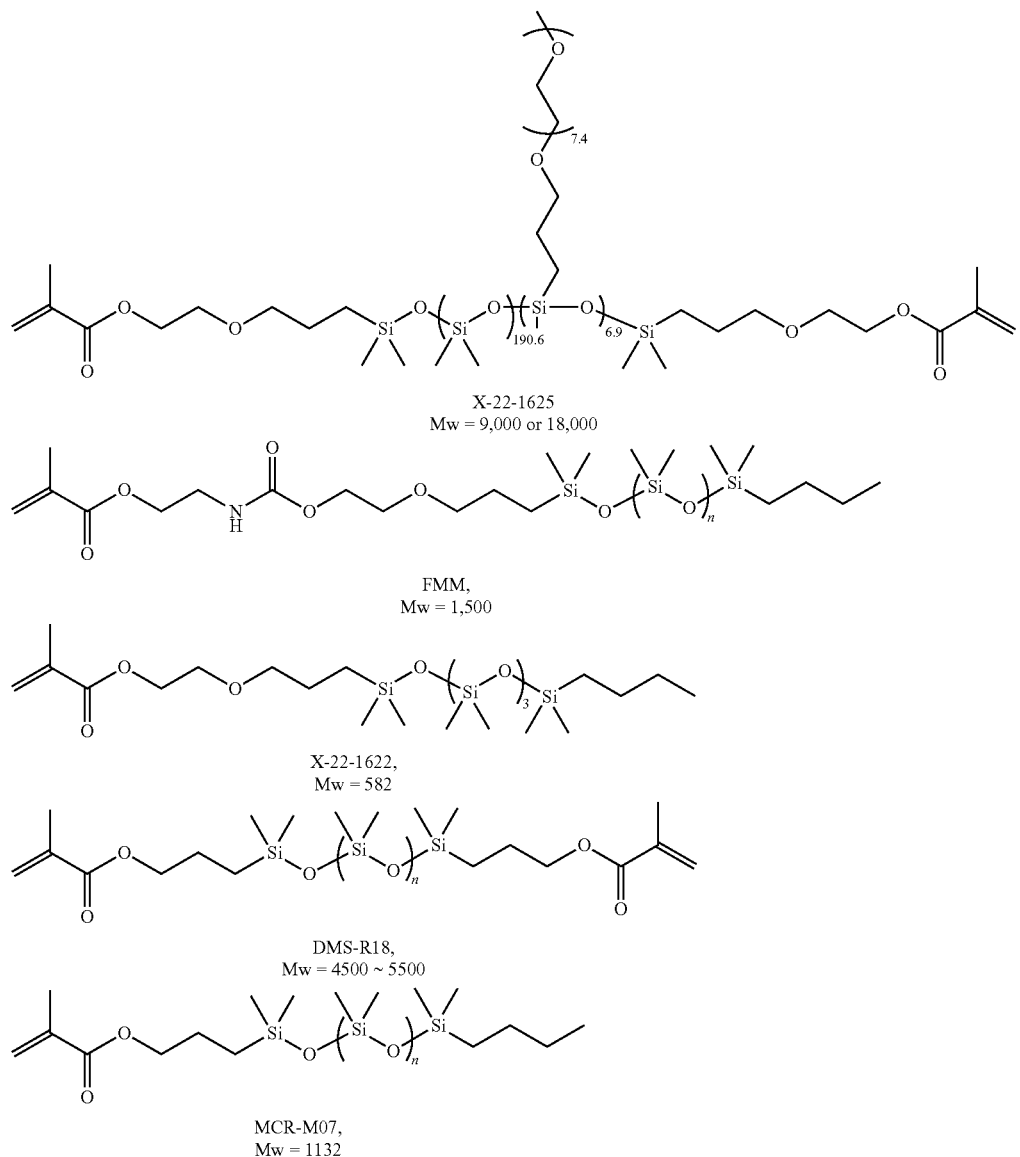

polymerizable compositions useful in accordance with the present disclosure. Silicon-containing components of structures (A) and/or (B) may be further used in combination with Yet other specific examples of the useful silicon-containing components useful in accordance with the present disclosure can be chemicals represented by the following formulas, or chemicals described in U.S. Patent Application Publication Number 2009/0234089, which is hereby incorporated by reference in its entirety. In one example, the silicon-containing component can comprise one or more a hydrophilic polysiloxane components represented by general formula (II),

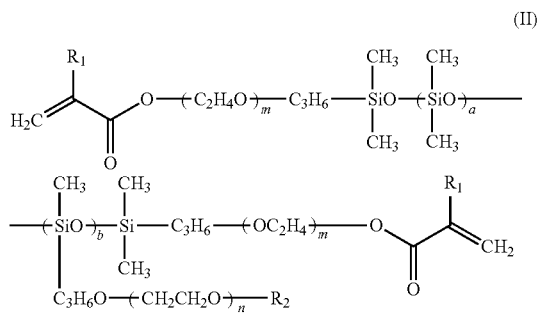

(II)

wherein $R_1$ is selected from either hydrogen or a methyl group; $R_2$ is selected from either of hydrogen or a $C_{1-4}$ hydrocarbon group; m represents an integer of from 0 to 10; n represents an integer of from 4 to 100; a and b represent integers of 1 or more; a+b is equal to 20-500; b/(a+b) is equal to 0.01-0.22; and the configuration of siloxane units includes a random configuration. Examples of such silicon-containing components are described in the Examples section of U.S. Patent Application Publication Number 2009/0234089, including Example 2 on page 7. Other silicon-containing components also can be used. For example, other suitable types can include, for example, poly(organosiloxane) monomers, macromers or prepolymers such as α,ω-bismethacryloxy-propyl polydimethylsiloxane. Another example is mPDMS (monomethacryloxypropyl terminated mono-n-butyl terminated polydimethylsiloxane). Other useful silicone containing components include silicon-containing vinyl carbonate or vinyl carbamate monomers, macromers or prepolymers including, without limitation, 1,3-bis[4-(vinyloxycarb-onyloxy)but-1-yl]tetramethylisiloxane 3-(vinyloxycarbonylthio)propyl-[tris(trimethylsiloxysilane], 3-[tris(trimethylsiloxy)silyl]propyl allyl carbamate, 3-[tris(trimethylsiloxy)silyl]propyl vinyl carbamate; trimethylsilylethyl vinyl carbonate, and trimethylsilylmethyl vinyl carbonate. Examples of one or more of these silicon-containing components can be provided, for example, in U.S. Pat. No. 5,998,498 and U.S. Pat. Application Publication Nos. 2007/0066706 A1, 2007/0296914 A1, and 2008/0048350, all the disclosures of which are incorporated herein by reference.

Some of the silicon-containing monomers, macromers or prepolymers that can be used in accordance with the present disclosure can be used as a single discrete monomer, macromer or prepolymer, or can be used as a mixture of two or more discrete monomers, macromers or prepolymers. For example, MCR-M07 is often provided as a mixture of silicon-containing compounds with a wide distribution of molecular weights. Alternatively, some of the silicon-containing monomers, macromers or prepolymers that can be used in accordance with the present disclosure can be provided as two or more monomers, macromers or prepolymers with discrete molecular weights. For example, X-22-1625 is available in a lower molecular weight version with a molecular weight of about 9000 Daltons, and as a higher molecular weight version with a molecular weight of about 18,000 Daltons.

The polymerizable compositions for use as described herein may include one or more hydrophobic monomers, including silicone-free hydrophobic monomers. Examples of such silicone-free hydrophobic monomers include, without limitation, acrylic and methacrylic acids and derivatives thereof, including methylmethacrylate, Combinations of two or more hydrophobic monomers may be employed.

Hydrophilic Monomers. Hydrophilic monomers, including silicone-free hydrophilic monomers, are included in the polymerizable compositions used to make the present silicone hydrogels. The silicone-free hydrophilic monomers exclude hydrophilic compounds that contain one or more silicon atoms. Hydrophilic monomers can be used in combination with silicon-containing monomers, macromers or prepolymers in the polymerizable compositions to form silicone hydrogels. In silicone hydrogels, hydrophilic monomer components include those that are capable of providing at least about 10% (w/w), or even at least about 25% (w/w) water content to the resulting hydrated lens when combined with the other polymerizable composition components. For silicone hydrogels, the total hydrophilic monomers can be from about 25% (w/w) to about 75% (w/w), or from about 35% (w/w) to about 65% (w/w), or from about 40% (w/w) to about 60% (w/w), of the polymerizable composition.

Monomers that may be included as the hydrophilic monomers typically possess at least one polymerizable double bond, at least one hydrophilic functional group, or both. Examples of polymerizable double bonds include, for example, vinyl, acrylic, methacrylic, acrylamido, methacrylamido, fumaric, maleic, styryl, isopropenylphenyl, O-vinylcarbonate, O-vinylcarbamate, allylic, O-vinylacetyl and N-vinyl lactam and N-vinylamido double bonds. In one example, the hydrophilic monomers are vinyl-containing (e.g., an acrylic containing monomer or a non-acrylic vinyl containing monomer). Such hydrophilic monomers may themselves be used as crosslinking agents.

Such hydrophilic monomers may be, but are not necessarily, crosslinking agents. Considered as a subset of acryloyl moieties as described above, an "acrylic-type" or "acrylic-containing" or acrylate-containing monomer is a monomer containing the acrylic group (CR'H=CRCOX) wherein R is H or $CH_3$, R' is H, alkyl, or carbonyl, and X is O or N, which are also known to polymerize readily.

For silicone hydrogels, the hydrophilic component can comprise silicon-free hydrophilic monomer components comprising an acrylic monomer (e.g., a monomer with a vinyl group at the α-carbon position and a carboxylic acid terminus, a monomer with a vinyl group at the α-carbon position and an amide terminus, etc.) and hydrophilic vinyl-containing ($CH_2$=CH—) monomer (i.e., a monomer containing a vinyl group that is not part of an acrylic group).

Illustrative acrylic monomers include N,N-dimethylacrylamide (DMA), 2-hydroxyethyl acrylate, glycerol methacrylate, 2-hydroxyethyl methacrylate (HEMA), methacrylic acid, acrylic acid, methylmethacrylate (MMA), ethylene glycol methyl ether methacrylate (EGMA), and any mixtures thereof. In one example, the total acrylic monomer content is in an amount ranging from about 5% (w/w) to about 50% (w/w) of the polymerizable composition used to prepare a silicone hydrogel lens product, and can be present in an amount ranging from about 10% (w/w) to about 40% (w/w), or from about 15% (w/w) to about 30% (w/w), of the polymerizable composition.

As described above, the hydrophilic monomer also can comprise a hydrophilic vinyl-containing monomer. Hydrophilic vinyl-containing monomers that may be incorporated into the materials of the present lenses include, without limitation, the following: N-vinyl lactams (e.g. N-vinyl pyrrolidone (NVP)), N-vinyl-N-methyl acetamide (VMA), N-vinyl-N-ethyl acetamide, N-vinyl-N-ethyl formamide, N-vinyl formamide, N-2-hydroxyethyl vinyl carbamate, N-carboxy-β-alanine N-vinyl ester and the like and mixtures thereof. One example of a vinyl-containing monomer is N-vinyl-N-methyl acetamide (VMA). The structure of VMA corresponds to $CH_3C(O)N(CH_3)$—$CH$=$CH_2$. In one example, the total vinyl-containing monomer content of the polymerizable composition is in an amount ranging from about 0% to about 50% (w/w), e.g., up to about 50% (w/v), of the polymerizable composition used to prepare the silicone hydrogel lens product, and can be present in an amount ranging from about 20% (w/w) to about 45% (w/w), or from about 28% (w/w) to about 40% (w/w), of the polymerizable composition. Other silicone-free lens-forming hydrophilic monomers known in the art also may be suitable.

Additional examples are the hydrophilic vinyl carbonate or vinyl carbamate monomers disclosed in U.S. Pat. No. 5,070,215, and the hydrophilic oxazolone monomers disclosed in U.S. Pat. No. 4,190,277. Other suitable hydrophilic monomers will be apparent to one skilled in the art. More preferred hydrophilic monomers which may be incorporated into the polymer of the present disclosure include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), and polyethyleneglycol monomethacrylate. In certain examples, hydrophilic monomers including DMA, NVP and mixtures thereof are employed.

Additional examples of materials used to make silicone hydrogel contact lenses include those materials disclosed in U.S. Pat. No. 6,867,245.

Crosslinking agents useful in producing the present contact lenses, such as the present silicone hydrogel contact lenses include, without limitation, the above-indicated crosslinking agents. Examples of acrylate-functionalized ethylene oxide oligomers for use in crosslinking agents can include oligo-ethylene oxide dimethacrylate. The crosslinking agent can be TEGDMA, TEGDVE, EGDMA, TMGDMA, or any combinations thereof. Typically, the crosslinking agents are present in the polymerizable silicone hydrogel composition in relatively small total amounts in the polymerizable composition, such as in an amount ranging from about 0.1% (w/w) to about 10% (w/w), or from about 0.5% (w/w) to about 5% (w/w), or from about 0.75% (w/w) to about 1.5% (w/w), by weight of the polymerizable composition.

In one example of a polymerizable composition, the composition can comprise a first monomer having a first reactivity ratio, and a second monomer having a second reactivity ratio that is less than the first reactivity ratio. As understood by persons or ordinary skill in the art, a reactivity ratio can be defined as the ratio of the reaction rate constant of each propagating species adding its own monomer to the rate constant for its addition of other monomer. Such compositions may also include at least one cross-linking agent having a reactivity ratio similar to the first reactivity ratio or to the second ratio. Such compositions may also include at least two crosslinking agents, the first crosslinking agent having a reactivity ratio similar to the first reactivity ratio, and the second crosslinking agent having a reactivity ratio similar to the second reactivity ratio. In certain examples, the lens precursor compositions may include one or more removable additives. For example, the polymerizable compositions may include one or more compatibilizers, demolding aids, delensing aids, wettability enhancers, and ionoflux reducers which are removable.

By providing relatively slow reacting monomers in the polymerizable compositions, such as by providing two or more monomer types with different reactivity ratios in the same polymerizable composition, it is possible to control the rate at which the hydrophilic and hydrophobic (e.g., silicone) monomers react during the curing process, and thereby control the wettability of the resulting polymerized lens body. In one example, the first slower reacting monomer or crosslinker can comprise a vinyl monomer or crosslinker (in other words, a monomer or crosslinker containing a vinyl functional group), and the second faster reacting monomer or crosslinker can comprise a methacrylate monomer or crosslinker (in other words, a monomer or crosslinker containing a methacrylate functional group).

The use of slower reacting hydrophilic monomers (as opposed to faster reacting hydrophobic monomers) can result in residual unreacted hydrophilic monomer and partially reacted monomer (including un-crosslinked or partially crosslinked hydrophilic polymer chains) remaining present in the lens body once the curing process has finished. The presence of these unreacted and partially reacted hydrophilic monomers such as monomers in the polymerizable composition which do not fully crosslink into the network during the curing process, can provide wettability to the polymerized lens body. The non-fully crosslinked agents, such as unreacted or only partially reacted monomers, oligomers, linear polymers, slightly crosslinked components, and the like, can be extracted from the polymerized component of the polymerized silicone hydrogel contact lens products, or can remain present in the polymerized lens body following washing.

Additional Hydrogel Components. The polymerizable compositions used in the lenses and in the methods described herein can also include additional components, e.g., one or more initiators, such as one or more thermal initiators, one or more ultraviolet (UV) initiators, visible light initiators, combinations thereof, and the like, one or more UV absorber agents or compounds, or UV radiation or energy absorber, tinting agent, pigments, release agents, antimicrobial compounds, and/or other additives. The term "additive" in the context of the present disclosure refers to a compound or any chemical agent provided in the present hydrogel contact lens polymerizable compositions or the polymerized hydrogel contact lens products, but which is not necessary for the manufacture of a hydrogel contact lens.

The polymerizable compositions may comprise one or more initiator compounds, i.e., a compound capable of initiating polymerization of a polymerizable composition. Thermal initiators, i.e., initiators having a "kick-off" temperature, can be used. For instance, exemplary thermal initiators that can be employed in the present polymerizable compositions include 2,2'-azobiz(isobutyronitrile) (AIBN, VAZO®-64), 2,2'-azobis(2,4-dimethylpentanenitrile) (VAZO®-52), 2,2'-Azobis(2-methylbutyronitrile) (VAZO®-67), and 1,1'-azobis(cyclohexanecarbonitrile) (VAZO®-88). For VAZO® thermal initiators, the grade number (i.e., 64, 52, 67, 88, etc.) is the Celsius temperature at which the half-life of the initiator in solution is 10 hours. All of the VAZO® thermal initiators described herein are available from DuPont (Wilmington, Del., USA). Additional thermal initiators, including nitrites as well as other types of initiators, are available from Sigma Aldrich. Ophthalmically compatible silicone hydrogel contact lenses can be obtained from polymerizable compositions that comprise from about 0.05% (w/w) to about 0.8% (w/w), or from about 0.1% (w/w) to about 0.6% (w/w), of VAZO®-64 or other thermal initiator.

In one example, the polymerizable composition can be a polymerizable composition essentially free of a UV absorber. Alternatively, the polymerizable composition as disclosed herein can further comprise at least one UV absorber. The UV absorber may be a UV absorber that exhibits relatively high absorption values in the UV-A range of about 320-380 nanometers, but is relatively transparent above about 380 nm. Examples of UV absorbers include photopolymerizable hydroxybenzophenones and photopolymerizable benzotriazoles, such as 2-hydroxy-4-acryloyloxy-ethoxy benzophenone, commercially available as CYASORB UV416 from Cytec Industries, West Paterson, N.J., USA, 2-hydroxy-4-(2 hydroxy-3-methacrylyloxy)propoxy-benzophenone, and photopolymerizable benzotriazoles, commercially available as NORBLOC® 7966 from Noramco, Athens, Ga., USA. Other photopolymerizable UV absorbers suitable for use in accordance with the present disclosure include polymerizable, ethylenically unsaturated triazines, salicylates, aryl-substituted acrylates, and mixtures thereof. The UV absorber can be a UV absorber which has a lower level of UV absorbance such as, for example, UV416, or can be a UV absorber which has a higher level of UV absorbance such as, for example, NORBLOC® 7966. Generally speaking, a UV absorber, if present, is provided in an amount corresponding to about 0.5 weight percent of the polymerizable composition to about 1.5 weight percent of the composition. For example, compositions can include from about 0.6% (w/w) to about 1.0% (w/w) of one or more UV absorbers.

The polymerizable compositions useful in accordance with the present disclosure may also include a tinting agent, although both tinted and clear lens products are contemplated. In one example, the tinting agent is a reactive dye or pigment effective to provide color to the resulting lens product. Tinting agents can include, for example, VAT Blue 6 (7,16-Dichloro-6,15-dihydroanthrazine-5,9,14,18-tetrone), 1-Amino-4-[3-(beta-sulfatoethylsulfonyl)anilio]-2-anthraquinonesulfonic acid (C I. Reactive Blue 19, RB-19), a copolymer of Reactive Blue 19 and hydroxyethylmethacrylate (RB-19 HEMA) 1,4-bis[4-[(2-methacryl-oxyethyl) phenylamino]anthraquinone (Reactive Blue 246, RB-246, available from Arran Chemical Company, Athlone, Ireland), 1,4-Bis[(2-hydroxyethyl)amino]-9,10-anthracenedione bis (2-propenoic)ester (RB-247), Reactive Blue 4, RB-4, or a copolymer of Reactive Blue 4 and hydroxyethyl methacrylate (RB-4 HEMA or "Blue HEMA"). Other exemplary tinting agents are disclosed for example, in U.S. Patent Application Publication No. 2008/0048350, the disclosure of which is incorporated in its entirety herein by reference. Other suitable tinting agents for use in accordance with the present disclosure are phthalocyanine pigments such as phthalocyanine blue and phthalocyanine green, chromic-alumina-cobaltous oxide, chromium oxides, and various iron oxides for red, yellow, brown and black colors. Opaquing agents such as titanium dioxide may also be incorporated. For certain applications, a mixture of colors may be employed. If employed, tinting agents can be present in an amount ranging from about 0.1% (w/w) to about 15% (w/w), or about 1% (w/w) to about 10% (w/w), or about 4% (w/w) to about 8% (w/w).

The polymerizable compositions may also comprise a demolding aid, that is to say, one or more ingredients effective in making more facile removal of the cured contact lenses from their molds. Exemplary demolding aids include hydrophilic silicones, polyalkylene oxides, and combinations thereof. The polymerizable compositions may additionally comprise a diluent selected from the group consisting of hexanol, ethoxyethanol, isopropanol (IPA), propanol, decanol and combinations thereof. Diluents, if employed, are typically present in amounts ranging from about 10% (w/w) to about 30% (w/w). Compositions having relatively higher concentrations of diluents tend to, but do not necessarily, have lower ionoflux values, reduced modulus, and increased elongation, as well as water break up times (WBUTs) greater than or equal to 20 seconds. Additional materials suitable for use in making hydrogel contact lenses are described in U.S. Pat. No. 6,867,245, the disclosure of which is incorporated in its entirety herein by reference. In certain examples, however, the polymerizable composition is diluent-free.

Silicone-containing hydrogel contact lenses are frequently referred to as silicone hydrogel contact lenses. Many silicone hydrogel contact lenses are based on polymerizable lens formulations that include siloxane monomers, macromers, prepolymers or combinations thereof, and at least one hydrophilic monomer, as previously described. Some examples of silicone hydrogel contact lens materials include materials having the following USANs: acquafilcon A or aquafilcon B, balafilcon A, comfilcon A, enfilcon A, galyfilcon A, lenefilcon A, lotrafilcon A, lotrafilcon B, senofilcon A, narafilcon A, and falcon II 3. In one example, the lens body with ophthalmically acceptably wettable anterior and posterior surfaces without application of a surface treatment to the lens body, or without the presence of an interpenetrating polymeric network (IPN) of a polymeric wetting agent in the lens body is a comfilcon A silicone hydrogel contact lens body.

The polymerizable composition used with one or more mold members comprising the thermoplastic polymer having low UV % T can have an average polarity from about 1% to about 7%, from about 2% to about 7%, from about 3% to about 6%, or of about 5%. The average polarity of the polymerizable composition can be determined using one or more standard tests or assays which are conventional and well known in the polymer art. For example, the average polarity of the polymerizable composition can be calculated using (a) the total surface tension ($\sigma_L^T$) of the polymerizable composition as determine by the pendant drop method, and (b) a calculation of the disperse component ($\sigma_L^D$) of the total surface tension of the polymerizable composition by determining the contact angle (θ) of the polymerizable composition on Teflon (polytetrafluoroethylene, PTFE) by using the equation:

$$\sigma_L^D = \frac{(\sigma_L^T)^2(\cos\theta_{PTFE} + 1)^2}{72}.$$

The measured disperse component of the surface tension ($\sigma_L^D$) can then be subtracted from the measured total surface tension ($\sigma_L^T$) to obtain the polar component of the surface tension using the equation: $\sigma_L^P = \sigma_L^T - \sigma_L^D$. The average polarity of the polymerizable composition is calculated by dividing the polar component ($\sigma_L^P$) by the total surface energy ($\sigma_L^T$) and multiplying by 100.

In another example, when the polymerizable composition described herein can be placed in contact with a mold member comprising a thermoplastic polymer having low UV % T as described herein, the spreading coefficient of the polymeriziable composition and the mold member can be greater than or equal to about 13 mN/m, can be from about 13 mN/m to about 18 mN/m, or from about 12 mN/m to about 15 mN/m. The spreading coefficient of the polymerizable composition and the thermoplastic polymer having low UV % T can be determined using one or more standard tests or assays which are conventional and well known in the polymer art. For example, the spreading coefficient can be determined based on the surface energy of the mold member ($\sigma_S$), the surface energy of the polymerizable composition ($\sigma_L$), and the interfacial tension at the interface of the polymerizable composition and the mold member ($\sigma_{SL}$) using the equation:

Spreading coefficient=$\sigma_S - \sigma_L - \sigma_{SL}$.

In yet another example, when the polymerizable composition described herein is cured in a mold assembly comprising first and second mold members comprising a thermoplastic polymer having low UV % T as described herein to form a polymerized lens body, the average adhesion energy of the components of the mold assembly (i.e., the first mold member, the second mold member and the polymerized lens body) can be greater than or equal to about 55 mJ/m$^2$, from about 55 mJ/m$^2$ to about 63 mJ/m$^2$, or from about 58 mJ/m$^2$ to about 61 mJ/m$^2$. The average adhesion energy of the mold assembly can be determined using one or more standard tests or assays which are conventional and well known in the polymer art. For example, the average adhesion energy can be calculated based on the disperse component of the total surface energy of the polymerizable composition ($\sigma_L^D$), the polar component of the total surface energy of the polymerizable composition ($\sigma_L^P$), the disperse component of the total surface energy of the thermoplastic polymer having low UV % T ($\sigma_S^D$), and the polar component of the total surface energy of the thermoplastic polymer having low UV % T ($\sigma_S^P$)—As previously described, the total surface energy, as well as the polar and disperse components of the surface energy, can be calculated based on the Owens-Wendt-Rabel-Kaebel model. The adhesion energy of the mold assembly can then be calculated using the equation:

Adhesion Energy=$2[(\sigma_S^D \sigma_L^D)^{1/2} + (\sigma_S^P \sigma_L^P)^{1/2}]$.

The thermoplastic polymer having low UV % Ts described herein can be used to cast mold silicone hydrogel contact lenses using dry demolding methods, dry delensing methods, or both dry demolding and delensing methods, i.e., demolding, delensing or both demolding and delensing processes which do not involve the application of a liquid to the polymerized lens body and the mold assembly or mold member.

The use of the thermoplastic polymer having low UV % Ts having low UV light transmittance described herein to cast mold silicone hydrogel lens bodies can also result in lens bodies with ophthalmically acceptably wettable lens surfaces without application of a surface treatment to the lens surfaces and without use of an interpenetrating network of a polymeric wetting agent in the lens body.

By using mold members comprising a thermoplastic polymer having low UV % T having a low level of UV transmittance as described herein, in conjunction with a polymerizable silicone hydrogel lens forming composition, the resulting polymerized lens body can be more wettable as compared to the same polymerizable composition molded using mold members comprising a thermoplastic polymer having low UV % T having a higher level of UV transmittance, such as, for example, EVOH.

Figure 2:
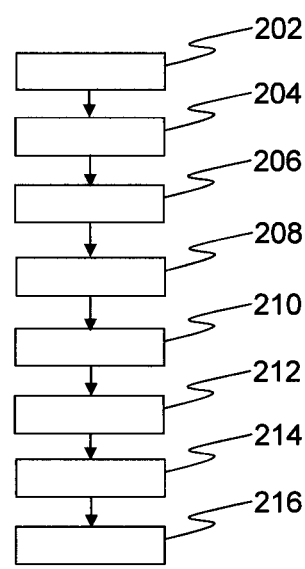
FIG. 2 is a flow chart illustrating certain inputs and outputs of the method of FIG. 1, including a polymerizable composition, a polymerized lens body which has not been contacted by a liquid, a hydrated lens body, and a packaged ophthalmic lens.

A method of manufacturing ophthalmic lenses, for example, silicone hydrogel contact lenses, is illustrated in FIG. 1. In accordance with the present disclosure, all of the steps illustrated in FIG. 1, or with a subset of the steps illustrated in FIG. 1. Items which serve as inputs, outputs or both inputs and outputs of the steps of FIG. 1 are illustrated in FIG. 2. FIG. 1 includes a step 102 of placing a polymerizable composition on or in a mold member, the mold member comprising a thermoplastic polymer having low UV % T as described herein (e.g., a thermoplastic polymer having a level of UV light transmittance of from about 0.05% T to about 0.3% T). In reference to the present disclosure, the polymerizable composition can be understood to be a lens precursor composition, such as, for example, a polymerizable silicone hydrogel contact lens precursor composition. The polymerizable composition is illustrated in FIG. 2 as element 202. The polymerizable composition may be understood to be a pre-polymerized or pre-cured composition suitable for polymerization. As used herein, the present polymerizable composition may also be referred to as a monomer mix.

Typically, the polymerizable composition or lens precursor composition is not polymerized before curing or polymerization of the composition. However, polymerizable compositions or lens precursor compositions may be partially polymerized before undergoing a curing process. In one example, the polymerizable composition may comprise a polymer component which becomes crosslinked with other components of the polymerizable composition during the curing process. The polymeric component can be a polymeric component which is not a polymeric wetting or comfort agent, which does not form an interpenetrating polymeric network in the lens body, or which is neither a polymeric wetting or comfort agent and does not form an IPN in the lens body.

The present lens precursor compositions can be provided in containers, dispensing devices, or contact lens molds prior to a curing or polymerization procedure, as described herein. Referring back to FIG. 1, in step 102, the lens precursor composition is placed on a molding surface (i.e., a region used to mold a lens surface) of a female contact lens mold member (i.e., within a concave molding surface). The female contact lens mold member may be understood to be a first contact lens mold member or an anterior contact lens mold member. For example, the female contact lens mold member has a molding surface that defines the anterior or front surface of a contact lens produced from the contact lens mold. The second contact lens mold member may be understood to be a male contact lens mold member or a posterior contact lens mold member. For example, the second contact lens mold member includes a molding surface that defines the posterior surface of a contact lens produced in the contact lens mold (i.e, the second or male mold member has a convex molding surface).

Further in reference to the present disclosure, the first and second mold members comprise, include, include a major amount of, consist essentially of, or consist of a thermoplastic polymer having low UV % T as described herein, such as, for example, PBT.

The first contact lens mold member is placed in contact with a second contact lens mold member to form a contact lens mold assembly having a contact lens-shaped cavity. The method illustrated in FIG. 1 includes a step 104 of closing a contact lens mold assembly by placing two contact lens mold members in contact with each other to form a contact lens mold assembly with a contact lens-shaped cavity. For example, with reference to FIG. 2, the polymerizable silicone hydrogel lens precursor composition 202 is located in the contact lens shaped cavity.

At step 106, the method illustrated in FIG. 1 includes directing UV light to an exterior surface of the mold assembly and into the lens-shaped cavity within the mold assembly, and using UV light to cure the polymerizable composition in the lens-shaped cavity to form a polymerized lens body which has not been contacted by a liquid and which is contained in a mold assembly, as illustrated in FIG. 2 as element 204. In one example the polymerized lens body is a silicone hydrogel contact lens body which has not been contacted by a liquid. During curing, the components of the polymerizable composition polymerize to form a polymerized lens body. Thus, the curing may also be understood to be a polymerizing step. The curing 106 includes exposing the polymerizable lens precursor composition to a level of UV light effective in polymerizing the components of the lens precursor composition. The curing 106 can also include curing the compositions in an oxygen-free or nearly oxygen-free environment. For example, the curing 106 can occur in the presence of nitrogen or other inert gases. The curing 106 can be effective to fully polymerize the polymerizable composition, or can polymerize the polymerizable composition to a level such that the lens body when processed (e.g., demolded, delensed, washed, packaged, sterilized, etc.) is capable of retaining its molded shape adequately to serve as a contact lens.

The polymerized lens body which has not been exposed to a liquid refers to a polymerized product prior to undergoing an optional washing process and prior to being contacted by a liquid as part of a wet demolding or a wet delensing process. For example, the washing process can be a cleaning process to remove dust or debris, an extraction process to remove a portion or substantially all of one or more extractable components from the polymerized lens body, or a hydration process to partially or fully hydrate the hydrogel lens body. For example, a polymerized lens product which has not been contacted by a liquid may be provided in a lens shaped cavity of a mold assembly after a curing process, may be provided on or in one contact lens mold member after dry demolding of the contact lens mold, or may be provided on or in an extraction tray or other device after a dry delensing procedure and prior to a washing procedure. In one particular example, a delensed polymerized lens body which has not been contacted by a liquid can be provided on or in an extraction tray or other device prior to being contacted by a liquid such as, for example, a cleaning liquid, an extraction liquid, a hydration liquid, and combinations thereof.

The polymerized lens body which has not been exposed to a liquid 204 may include a lens forming component, such as a silicone-containing polymeric network or matrix in the shape of a lens, and a removable component that can be removed from the lens body following polymerization. The removable component can be understood to include unreacted monomers, oligomers, partially reacted monomers, or other agents which have not become covalently attached or otherwise immobilized relative to the lens-forming component. The removable component can also be understood to include one or more additives, including diluents, that can be removed from the polymerized lens product during a cleaning, extraction, or hydration procedure, as discussed herein. Thus, materials of the removable component can include linear uncross-linked or slightly cross-linked or branched polymers of extractable materials that are not cross-linked to or otherwise immobilized relative to the polymer backbone, network, or matrix of the lens body.

After curing the polymerizable compositions, the method illustrated in FIG. 1 includes a step 108 of demolding the mold assembly. Demolding refers to the process of separating two mold members, such as male and female mold members, of a mold assembly containing a polymerized lens body. The demolding process results in a polymerized lens body remaining in contact with one, and only one, mold member 206 of the two mold members used to form the lens body. Following the demolding process, the polymerized lens body is located on, or remains in contact with just one of the mold members of the mold assembly. For example, the polymerized lens body may be located on, or in contact with, the male mold member or may be located on, or in contact with, the female mold member. When a dry demolding process is used, the resulting polymerized lens body remaining in contact with one mold member 206 has not been contacted by a liquid.

During a delensing step, a polymerized lens body remaining in contact with one mold member 206 is released from the one mold member with which it was in contact, as shown in step 110 of FIG. 1. The lens body can be delensed from the male mold member or the female mold member, depending on which mold member the polymerized lens body remained in contact with following the demolding step 108. Following the delensing step, the released lens body is a delensed lens body 208. When a dry demolding process is followed by a dry delensing process, the resulting delensed polymerized lens body is a delensed polymerized lens body which has not been contacted by a liquid.

The method illustrated in FIG. 1 optionally includes a step 112 of washing the lens body by contacting the polymerized lens body with a liquid, for example an organic solvent, an organic solvent solution, water or an aqueous solution, to clean dust or debris from the lens body, to extract the lens body to remove extractable materials from the lens body, or to fully or partially hydrate the lens body. The washing step 112 results in a cleaned, extracted or hydrated lens body 210, as shown in FIG. 2. The washing step 112 can optionally be conducted on a mold assembly including a polymerized lens body, a polymerized lens body remaining in contact with one mold member 206, a delensed lens body 208, and can be conducted repeatedly during the manufacturing process.

After optionally washing the polymerized lens body, the method can optionally include a step 114 of hydrating the polymerized lens body. The hydrating step 114 can include contacting a polymerized lens body or one or more batches of such lens bodies with water or an aqueous solution to form a hydrated lens product, such as, for example, a silicone hydrogel contact lens 212, as shown in FIG. 2. The hydration step can fully or partially hydrate the lens body. In one example, the polymerized lens body which is hydrated in step 114 is a delensed polymerized lens body which has not been contacted by a liquid prior to the hydration step 114. In another example, the polymerized lens body which is hydrated in step 114 is a polymerized lens body remaining in contact with one mold member 206 which has not been contacted by a liquid prior to the hydration step 114. In this example, the hydration step 114 can act as both a hydration step 114 and a delensing step 110. In yet another example, the polymerized lens body which is hydrated in step 114 can be a polymerized lens body in a mold assembly 204. In this example, the polymerized lens body which is hydrated in step 114 is a polymerized lens body contained in a mold assembly which has not previously been contacted by a liquid, and the hydration step 114 can serves as both a demolding step 108 and as part or all of a hydration step 114.

After demolding, and optionally washing and/or hydrating the polymerized lens body, the method illustrated in FIG. 1 can optionally include a step 116 of packaging the lens body to produce a packaged ophthalmic lens product 214. For example, the lens body can be placed in a blister pack, vial or other suitable container along with a volume of a packaging liquid, such as a saline solution, including buffered saline solutions. In one example, the hydration step 114 and packaging step may be conducted simultaneously by placing a polymerized lens body which has not previously been contacted by a liquid in a blister pack or container with a portion of packaging liquid which serves as both a packaging liquid and a hydration solution. The polymerized lens body which is hydrated and packaged simultaneously in this example can be a delensed polymerized lens body which had not previously been contacted by a liquid, or a polymerized lens body remaining in contact with one mold member which had not previously been contacted by a liquid, where both the lens body and the one mold member are placed in the package.

The blister pack or container of the packaged ophthalmic lens product 214 can be sealed, and subsequently sterilized, as shown in optional step 118 of FIG. 1. For example, the packaged ophthalmic lens product can be exposed to sterilizing amounts of radiation, including heat, such as by autoclaving, gamma radiation, e-beam radiation, ultraviolet radiation, and the like. Depending upon the previous process steps used, the sterilization process can also serve to partially or fully extract, fully hydrate, or both extract and hydrate the packaged ophthalmic lens body.

The present invention includes the following aspects/embodiments/features in any order and/or in any combination:

1. The present invention relates to a method of manufacturing a silicone hydrogel contact lens body, comprising:
    providing a first mold member and a second mold member, the first mold member comprising a concave molding surface configured to mold an anterior surface of a contact lens and the second mold member comprising a convex molding surface configured to mold a posterior surface of a contact lens, the molding surface of at least one of the first mold member and the second mold member comprising at least one thermoplastic polymer having a level of UV transmittance of from about 0.01% to about 3.00%, the first mold member and the second mold member being configured to form a lens-shaped cavity therebetween when combined as a mold assembly;
    placing a polymerizable composition comprising a) at least one silicon-containing monomer, silicon-containing macromer, silicon-containing prepolymer, or any combination thereof, and b) at least one hydrophilic monomer in the first mold member;
    assembling the mold assembly by placing the second mold member in contact with the first mold member so as to form a lens-shaped cavity therebetween with the polymerizable composition contained in the lens-shaped cavity of the mold assembly; and
    directing UV light through the mold assembly into the lens-shaped cavity to cure the polymerizable composition in the mold assembly, forming a cast-molded polymerized reaction product in the lens-shaped cavity of the mold assembly, the polymerized reaction product comprising a silicone hydrogel contact lens body.

2. The method of any preceding or following embodiment/feature/aspect, wherein the at least one thermoplastic polymer has a level of UV transmittance of from about 0.01% to about 0.30%.

3. The method of any preceding or following embodiment/feature/aspect, wherein the level of UV transmittance of the at least one thermoplastic polymer is determined over a range of wavelengths from about 250 nanometers to about 800 nanometers.

4. The method of any preceding or following embodiment/feature/aspect, wherein the level of UV transmittance of the at least one thermoplastic polymer is determined using a sample of the thermoplastic polymer having a thickness of from about 0.4 mm to about 0.9 mm.

5. The method of any preceding or following embodiment/feature/aspect, wherein the step of directing the UV light comprises delivering an intensity of UV light from about 20 $\mu W/cm^2$ to about 90 $\mu W/cm^2$ into the lens-shaped cavity of the mold assembly.

6. The method of any preceding or following embodiment/feature/aspect, wherein the at least one thermoplastic polymer has a high level of UV light diffusivity, and is effective to reduce the variation in UV light intensity in the lens-shaped cavity by at least 5% during the step of directing UV light.

7. The method of any preceding or following embodiment/feature/aspect, wherein the at least one of the first molding member and the second molding member comprising the at least one polar thermoplastic polymer is formed by injection molding, and the mold tool used to form the mold member is maintained at a temperature from about 30° C to about 70° C during the injection molding.

8. The method of any preceding or following embodiment/feature/aspect, wherein the at least one polar thermoplastic polymer comprises polybutylene terephthalate (PBT).

9. The method of any preceding or following embodiment/feature/aspect, wherein the method further comprise a step of separating the mold assembly using a dry demolding method which does not involve application of a liquid to the mold assembly containing the lens body, leaving the lens body in contact with one and only one of the first mold member and the second mold member.

10. The method of any preceding or following embodiment/feature/aspect, wherein the method further comprises a step of releasing the lens body from the one and only one of the first mold member and the second mold member with which it remains in contact following the demolding step, using a dry delensing method which does not involve application of a liquid to the lens body and the only one mold member.

11. The method of any preceding or following embodiment/feature/aspect, wherein the method further comprises hydrating the lens body, wherein, when fully hydrated, the lens body has an advancing contact angle of less than about 100°.

12. The method of any preceding or following embodiment/feature/aspect, wherein the hydrophilic monomer of the polymerizable composition comprises a hydrophilic monomer with an N-vinyl group.

13. The method of any preceding or following embodiment/feature/aspect, wherein the lens body is a comfilcon A silicone hydrogel lens body.

14. A silicone hydrogel contact lens body, comprising:
    a cast-molded polymerized lens body comprising the reaction product of a polymerizable composition, the polymerizable composition comprising a) at least one silicon-containing monomer, silicon-containing macromer, silicon-containing prepolymer or combinations thereof, and b) at least one hydrophilic monomer;

wherein the lens body is a UV-cured cast-molded in a mold assembly comprising a first mold member and a second mold member, at least one molding surface of the first mold member and the second mold member comprising at least one thermoplastic polymer having a level of UV transmittance of from about 0.01% to about 3.00%; and the lens body has ophthalmically acceptably wettable anterior and posterior surfaces without application of a surface treatment to the lens body, or without the presence of an interpenetrating network (IPN) of a polymeric wetting agent in the lens body.

15. A mold member for cast molding a silicone hydrogel contact lens body, wherein the mold member comprises at least one thermoplastic polymer having a level of UV transmittance of from about 0.01% to about 3.00% and an average polarity of from about 1% to about 7%.

The present invention can include any combination of these various features or embodiments above and/or below as set forth in sentences and/or paragraphs. Any combination of disclosed features herein is considered part of the present invention and no limitation is intended with respect to combinable features.

The following non-limiting Examples illustrate certain aspects of the present methods and devices.

Example 1

Comparative

A quantity of SOARLITE™ S ethylene vinyl alcohol (EVOH) polymer (Nippon Gohsei, Ltd., Osaka, Japan)) was provided in granular or pellet form. SOARLITE™ S was found to have an average UV light transparency of about 43% between 320 nm and 420 nm, and of 45% at 370 nm as determined using a sample having a thickness between 0.6 mm and 0.7 mm; to have an average polarity from about 10% to about 12%; and an average surface energy of about 38 mN/m. A portion of the polymer was processed by conventional injection molding into contact lens mold members. A polymerizable composition for producing comfilcon A lenses was prepared, and was used to prepare a plurality of cast-molded polymerized silicone hydrogel lens bodies as illustrated in FIG. 1. The average polarity of the comfilcon A polymerizable composition was about 5%. When the mold assemblies comprising SOARLITE™ S were used to cast mold the comfilcon A lenses, the polymerizable composition was found to have a spreading coefficient of about 12, and, after curing, the mold assemblies were found to have an average adhesion energy of about 58 mJ/m². After UV curing using an in-mold UV light intensity range of from about 40 µW/cm² to about 70 µW/cm², the mold assemblies including the cast-molded polymerized lens bodies were dry demolded to separate the two mold members of the mold assembly. It was very difficult if not impossible to separate the two mold members of the mold assembly to obtain a mold member with a polymerized lens body of acceptable quality for use as a contact lens remaining in contact with the one mold member. The yield of demolded mold members in contact with lens bodies of acceptable quality was less than or equal to about 10%. Following the dry demolding step, a wet delensing process was used to release the polymerized lens bodies from the one mold member with which they remained in contact following the demolding step. The released lens bodies were subsequently washed using an aqueous solution essentially free of an organic solvent, then packaged and sterilized. The lens bodies were not treated using a surface treatment to increase wettability, and did not contain an interpenetrating network of a polymeric wetting agent. Once the lens bodies were fully hydrated, they had ophthalmically acceptably wettable surfaces. The WBUT of the lenses was determined to be about 52 seconds, and the sessile drop contact angle of the lenses was determined to be about 35°.

Example 2

Comparative

A quantity of FINA™ PPH3066 polypropylene (Total Petrochemicals USA, Inc., Houston, Tex., USA)) was provided in granular or pellet form. The polypropylene was found to have an average UV light transparency of about 40% between 320 nm and 420 nm, and of 47% at 370 nm as determined using a sample having a thickness between 0.6 mm and 0.7 mm. A portion of the polymer was processed by conventional injection molding into contact lens mold members. A polymerizable composition for producing comfilcon A lenses was prepared, and was used to prepare a plurality of cast-molded polymerized silicone hydrogel lens bodies as illustrated in FIG. 1. The average polarity of the comfilcon A polymerizable composition was about 5%. After UV curing using an in-mold UV light intensity range of from about 40 µW/cm² to about 70 µW/cm², the mold assemblies including the cast-molded polymerized lens bodies were dry demolded to separate the two mold members of the mold assembly. Following the dry demolding step, a wet delensing process was used to release the polymerized lens bodies from the one mold member with which they remained in contact following the demolding step. The released lens bodies were subsequently washed using an aqueous solution essentially free of an organic solvent, then packaged and sterilized. The lens bodies were not treated using a surface treatment to increase wettability, and did not contain an interpenetrating network of a polymeric wetting agent. Once the lens bodies were fully hydrated, they were found to have lens surfaces which were not acceptably wettable.

Example 3

A quantity of CELANEX® 2000-2 PBT polymer (Ticona, Florence, Ky., USA) was provided in granular or pellet form. CELANEX® 2000-2 is an unreinforced polybutylene terephthalate containing an internal lubricant. It is reported to have a melting temperature of about 225° C when measured using ISO 11357-1, -2, -3 at a rate of 10° C/min, a glass transition temperature below about 60° C when measured using ISO 11357-1, -2, -3 at a rate of 10° C/min. CELANEX® 2000-2 was found to have an average UV light transmittance level of about 0.11% T from 320 nm to 420 nm, and of about 0.12% T at 370 nm as determined on a sample having a thickness of from 0.6 mm to 0.7 mm CELANEX® 2000-2 was also found to have an average polarity of about 3%, an average surface energy of about 38 mN/m, and a glass transition temperature of about 46.7° C A portion of the polymer was processed by conventional injection molding into contact lens mold members. A polymerizable composition for producing comfilcon A lenses was prepared, and was used to prepare a plurality of cast-molded polymerized silicone hydrogel lens bodies as illustrated in FIG. 1. The average polarity of the comfilcon A polymerizable composition was about 5%. When the mold assemblies comprising CELANEX® 2000-2 were used to cast mold the comfilcon A lenses, the polymerizable composition was found to have a spreading coefficient of about 13, and, after curing, the mold assemblies were found to have an average adhesion energy of about 59 mJ/m². After UV curing using an in-mold UV light intensity range of from about 40 µW/cm² to about 70 µW/cm², the mold assemblies including the cast-molded polymerized lens bodies were dry demolded to separate the two mold members of the mold assembly. The mold assemblies were readily dry demolded to obtain a mold member with a polymerized lens body of acceptable quality for use as a contact lens remaining in contact with the one mold member. The yield of demolded mold members in contact with lens bodies of acceptable quality was greater than or equal to about 50%. Following the dry demolding step, a wet delensing process was used to release the polymerized lens bodies from the one mold member with which they remained in contact following the demolding step. The released lens bodies were subsequently washed using an aqueous solution essentially free of an organic solvent, then packaged and sterilized. The lens bodies were not treated using a surface treatment to increase wettability, and did not contain an interpenetrating network of a polymeric wetting agent. Once the lens bodies were fully hydrated, they had ophthalmically acceptably wettable surfaces. The WBUT of the lenses was determined to be about 26 seconds, and the sessile drop contact angle of the lenses was determined to be about 26°.

Example 4

A quantity of ARNITE® T06-202 PBT polymer (DSM, Heerlen, The Netherlands) was provided in granular or pellet form. ARNITE® T06-202 is a medium viscosity form of polybutylene terephthalate suitable for injection molding. It has a temperature of deflection under a 1.80 MPa load of about 55° C, and under a 0.45 MPa load of about 165° C, both measured using ISO 75-1, -2. ARNITE® T06-2022 was found to have an average UV light transmittance level of about 0.14% T from 320 nm to 420 nm, and of about 0.17% T at 370 nm as determined on a sample having a thickness of from 0.6 mm to 0.7 mm. ARNITE® T06-2022 was also found to have an average polarity of about 3%, and an average total surface energy of about 38 mN/m. A portion of the polymer was processed by conventional injection molding into contact lens mold members. A polymerizable composition for producing comfilcon A lenses was prepared, and was used to prepare a plurality of cast-molded polymerized silicone hydrogel lens bodies as illustrated in FIG. 1. The average polarity of the comfilcon A polymerizable composition was about 5%. When the mold assemblies comprising ARNITE® T06-2022 were used to cast mold the comfilcon A lenses, the polymerizable composition was found to have a spreading coefficient of about 13, and, after curing, the mold assemblies were found to have an average adhesion energy of about 59 mJ/m². After UV curing using an in-mold UV light intensity range of from about 40 µW/cm² to about 70 µW/cm², the mold assemblies including the cast-molded polymerized lens bodies were dry demolded to separate the two mold members of the mold assembly. The mold assemblies were readily dry demolded to obtain a mold member with a polymerized lens body of acceptable quality for use as a contact lens remaining in contact with the one mold member. The yield of demolded mold members in contact with lens bodies of acceptable quality was greater than or equal to about 50%. Following the dry demolding step, a wet delensing process was used to release the polymerized lens bodies from the one mold member with which they remained in contact following the demolding step. The released lens bodies were subsequently washed using an aqueous solution essentially free of an organic solvent, then packaged and sterilized. The lens bodies were not treated using a surface treatment to increase wettability, and did not contain an interpenetrating network of a polymeric wetting agent. Once the lens bodies were fully hydrated, they had ophthalmically acceptably wettable surfaces. The WBUT of the lenses was determined to be about 35 seconds, and the sessile drop contact angle of the lenses was determined to be about 19°.

Example 5

A quantity of CRASTIN® FGS600F40 NC010 PBT polymer (DuPont, Wilmington, Del., USA) was provided in granular or pellet form. CRASTIN® FGS600F40 NC010 is an unreinforced low viscosity form of polybutylene terephthalate suitable for injection molding. It has a melting temperature of about 437° C as measured using ISO 11357-3. Unannealed, it has a heat deflection temperature under 66 psi of abut 239° C and under 264 psi of about 356° C, as measured using ISO 75-2/B. CRASTIN® FGS600F40 NC010 was found to have an average UV light transmittance level of about 0.09% T from 320 nm to 420 nm, and of about 0.09% T at 370 nm as determined on a sample having a thickness of from 0.6 mm to 0.7 mm. CRASTIN® FGS600F40 NC010 was also found to have an average polarity of about 7%, and an average total surface energy of about 41 mN/m. A portion of the polymer was processed by conventional injection molding into contact lens mold members. A polymerizable composition for producing comfilcon A lenses was prepared, and was used to prepare a plurality of cast-molded polymerized silicone hydrogel lens bodies as illustrated in FIG. 1. The average polarity of the comfilcon A polymerizable composition was about 5%. When the mold assemblies comprising CRASTIN® FGS600F40 NC010 were used to cast mold the comfilcon A lenses, the polymerizable composition was found to have a spreading coefficient of about 15, and, after curing, the mold assemblies were found to have an average adhesion energy of about 61 mJ/m². After UV curing using an in-mold UV light intensity range of from about 40 µW/cm² to about 70 µW/cm², the mold assemblies including the cast-molded polymerized lens bodies were dry demolded to separate the two mold members of the mold assembly. The mold assemblies were readily dry demolded to obtain a mold member with a polymerized lens body of acceptable quality for use as a contact lens remaining in contact with the one mold member. The yield of demolded mold members in contact with lens bodies of acceptable quality was greater than or equal to about 50%. Following the dry demolding step, a wet delensing process was used to release the polymerized lens bodies from the one mold member with which they remained in contact following the demolding step. The released lens bodies were subsequently washed using an aqueous solution essentially free of an organic solvent, then packaged and sterilized. The lens bodies were not treated using a surface treatment to increase wettability, and did not contain an interpenetrating network of a polymeric wetting agent. Once the lens bodies were fully hydrated, they had ophthalmically acceptably wettable surfaces. The WBUT of the lenses was determined to be about 55 seconds, and the sessile drop contact angle of the lenses was determined to be about 15°.

While these methods and devices have been described with respect to various specific examples, it is to be understood that the disclosure is not limited thereto and that the methods and devices can be variously practiced within the scope of the following claims.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of manufacturing a silicone hydrogel contact lens body, comprising:
    providing a first mold member and a second mold member, the first mold member comprising a concave molding surface configured to mold an anterior surface of a contact lens and the second mold member comprising a convex molding surface configured to mold a posterior surface of a contact lens, the molding surface of at least one of the first mold member and the second mold member comprising at least one thermoplastic polymer having a level of UV transmittance of from 0.01% to 3.00%, the first mold member and the second mold member being configured to form a lens-shaped cavity therebetween when combined as a mold assembly;
    placing a polymerizable composition comprising a) at least one silicon-containing monomer, silicon-containing macromer, silicon-containing prepolymer, or any combination thereof, and b) at least one hydrophilic monomer in the first mold member;
    assembling the mold assembly by placing the second mold member in contact with the first mold member so as to form a lens-shaped cavity therebetween with the polymerizable composition contained in the lens-shaped cavity of the mold assembly; and
    directing UV light through the mold assembly into the lens-shaped cavity to cure the polymerizable composition in the mold assembly, forming a cast-molded polymerized reaction product in the lens-shaped cavity of the mold assembly, the polymerized reaction product comprising a silicone hydrogel contact lens body,
    wherein the level of UV transmittance of the at least one thermoplastic polymer is determined at 370 nm using a sample of the thermoplastic polymer having a thickness of from 0.6 mm to 0.7 mm, and the at least one thermoplastic polymer has a high level of UV light diffusivity, and is effective to reduce variation in UV light intensity between an exterior surface of the mold assembly and the lens-shaped cavity by at least 5% during the step of directing UV light.

2. The method of claim 1, wherein the at least one thermoplastic polymer has a level of UV transmittance of from 0.01% to 0.30%.

3. The method of claim 1, wherein the step of directing the UV light comprises delivering an intensity of UV light from 20 $\mu$W/cm$^2$ to 90 $\mu$W/cm$^2$ into the lens-shaped cavity of the mold assembly.

4. The method of claim 1, wherein the at least one of the first molding member and the second molding member comprising the at least one thermoplastic polymer is formed by injection molding, and the mold tool used to form the mold member is maintained at a temperature from 30° C to 70° C during the injection molding.

5. The method of claim 1, wherein the at least one thermoplastic polymer comprises polybutylene terephthalate (PBT).

6. The method of claim 1, wherein the method further comprises a step of separating the mold assembly using a dry demolding method which does not involve application of a liquid to the mold assembly containing the lens body, leaving the lens body in contact with one and only one of the first mold member and the second mold member.

7. The method of claim 6, wherein the method further comprises a step of releasing the lens body from the one and only one of the first mold member and the second mold member with which it remains in contact following the demolding step, using a dry delensing method which does not involve application of a liquid to the lens body and the only one mold member.

8. The method of claim 1, wherein the method further comprises hydrating the lens body, wherein, when fully hydrated, the lens body has an advancing contact angle of less than 100°.

9. The method of claim 1, wherein the hydrophilic monomer of the polymerizable composition comprises a hydrophilic monomer with an N-vinyl group.

10. The method of claim 1, wherein the lens body is a comfilcon A silicone hydrogel lens body.

* * * * *